(12) United States Patent
Kassemi et al.

(10) Patent No.: US 12,125,034 B2
(45) Date of Patent: *Oct. 22, 2024

(54) EMAIL BASED E-COMMERCE WITH QR CODE BARCODE, IMAGE RECOGNITION ALTERNATIVE PAYMENT METHOD AND BIOMETRICS

(71) Applicant: SWOOP IP HOLDINGS LLC, Wilmington, DE (US)

(72) Inventors: James Kassemi, Albuquerque, NM (US); Chad Person, Albuquerque, NM (US); John P. Killoran, Jr., Albuquerque, NM (US); Patrick Killoran, Jackson Heights, NY (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 346 days.

This patent is subject to a terminal disclaimer.

(21) Appl. No.: 17/522,997

(22) Filed: Nov. 10, 2021

(65) Prior Publication Data

US 2022/0067736 A1 Mar. 3, 2022

Related U.S. Application Data

(63) Continuation of application No. 15/110,662, filed as application No. PCT/US2014/072279 on Dec. 23, 2014, now Pat. No. 11,182,790.

(Continued)

(51) Int. Cl.
*G06Q 20/40* (2012.01)
*G06Q 20/12* (2012.01)
(Continued)

(52) U.S. Cl.
CPC ........ *G06Q 20/4014* (2013.01); *G06Q 20/12* (2013.01); *G06Q 20/3276* (2013.01);
(Continued)

(58) Field of Classification Search
CPC .............. G06Q 20/4014; G06Q 20/12; G06Q 20/3276; G06Q 20/367; G06Q 20/382; G06Q 20/3823
(Continued)

(56) References Cited

U.S. PATENT DOCUMENTS 6,101,485 A 8/2000 Fortenberry et al.
6,167,435 A 12/2000 Druckenmiller et al.
(Continued)

OTHER PUBLICATIONS

"Kotalwar et al., QR Codes and Security Mechanism Using Mobile Phones, May 2013, International Journal of Advanced Research in Computer Science, vol. 4, No. 6, pp. 133-136" (Year: 2013).*

*Primary Examiner* — Courtney P Jones
(74) *Attorney, Agent, or Firm* — VOLPE KOENIG

(57) ABSTRACT

A system and method implemented in an e-commerce system to facilitate transactions between a customer and a vendor is disclosed. The method includes generating the requested at least one QR code and token, wherein the at least one QR code and token includes at least an email field, transmitting the at least one QR code and token, receiving a response email, wherein the response email includes the token, decoding, the token, performing a validation, and processing the transaction, on a condition that the validation(s) are approved.

9 Claims, 27 Drawing Sheets

Related U.S. Application Data

(60) Provisional application No. 62/096,440, filed on Dec. 23, 2014, provisional application No. 61/925,409, filed on Jan. 9, 2014.

(51) Int. Cl.
*G06Q 20/32* (2012.01)
*G06Q 20/36* (2012.01)
*G06Q 20/38* (2012.01)

(52) U.S. Cl.
CPC ......... *G06Q 20/367* (2013.01); *G06Q 20/382* (2013.01); *G06Q 20/3823* (2013.01)

(58) Field of Classification Search
USPC .......................................................... 705/67
See application file for complete search history.

(56) References Cited

U.S. PATENT DOCUMENTS

| | | | |
|---|---|---|---|
| 8,538,845 B2 | 9/2013 | Liberty | |
| 8,606,703 B1 | 12/2013 | Dorsey et al. | |
| 8,725,635 B2 | 5/2014 | Klein et al. | |
| 8,762,272 B1 | 6/2014 | Cozens et al. | |
| 9,189,785 B2 | 11/2015 | Liberty et al. | |
| 9,202,218 B1* | 12/2015 | Crisman | G06Q 30/0281 |
| 9,208,488 B2 | 12/2015 | Liberty | |
| 9,892,386 B2 | 2/2018 | Liberty | |
| 10,395,223 B2 | 8/2019 | Muthu et al. | |
| 10,515,345 B2 | 12/2019 | Koh et al. | |
| 2006/0106738 A1 | 5/2006 | Schleicher | |
| 2006/0253335 A1 | 11/2006 | Keena et al. | |
| 2007/0255620 A1 | 11/2007 | Tumminaro et al. | |
| 2008/0189770 A1 | 8/2008 | Sachtjen | |
| 2009/0006233 A1 | 1/2009 | Chemtob | |
| 2009/0228340 A1 | 9/2009 | Bohannon | |
| 2010/0070419 A1 | 3/2010 | Vadhri | |
| 2011/0040974 A1 | 2/2011 | Kaplan | |
| 2011/0110364 A1 | 5/2011 | Fried | |
| 2012/0130898 A1 | 5/2012 | Snyder et al. | |
| 2012/0253896 A1 | 10/2012 | Killoran, Jr. | |
| 2013/0097253 A1 | 4/2013 | Mencke | |
| 2013/0144700 A1 | 6/2013 | Vandeburg | |
| 2013/0179156 A1* | 7/2013 | Fried | G06F 16/438 235/375 |
| 2013/0191892 A1 | 7/2013 | Cadden | |
| 2013/0275264 A1 | 10/2013 | Lindenberg | |
| 2014/0067619 A1 | 3/2014 | Heimbach | |
| 2014/0279436 A1* | 9/2014 | Dorsey | G06Q 20/10 705/39 |
| 2015/0039517 A1 | 2/2015 | Liberty | |
| 2015/0052055 A1 | 2/2015 | Kassemi | |
| 2015/0127438 A1 | 5/2015 | Wedderburn | |
| 2015/0178757 A1 | 6/2015 | Moshal | |

\* cited by examiner

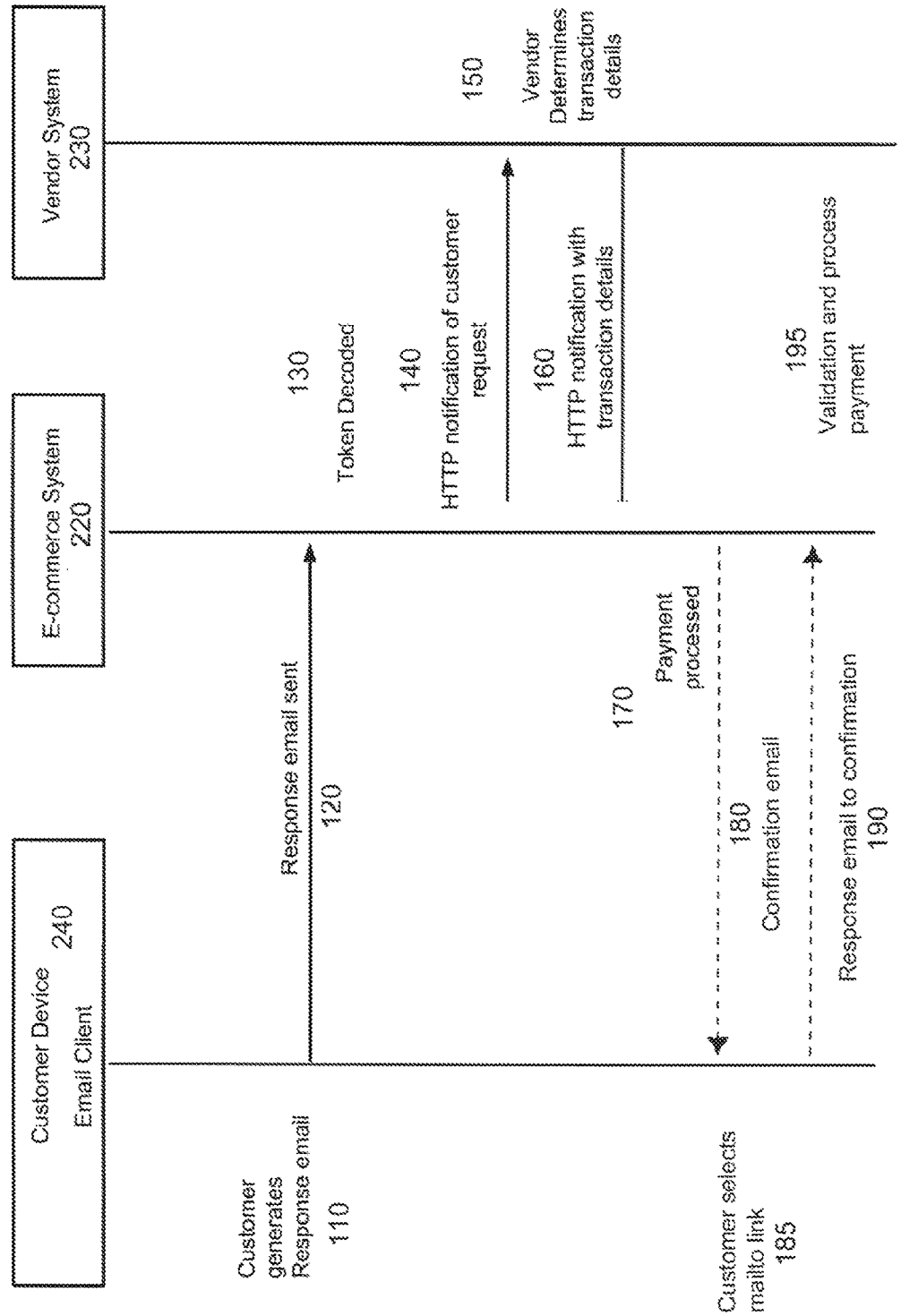

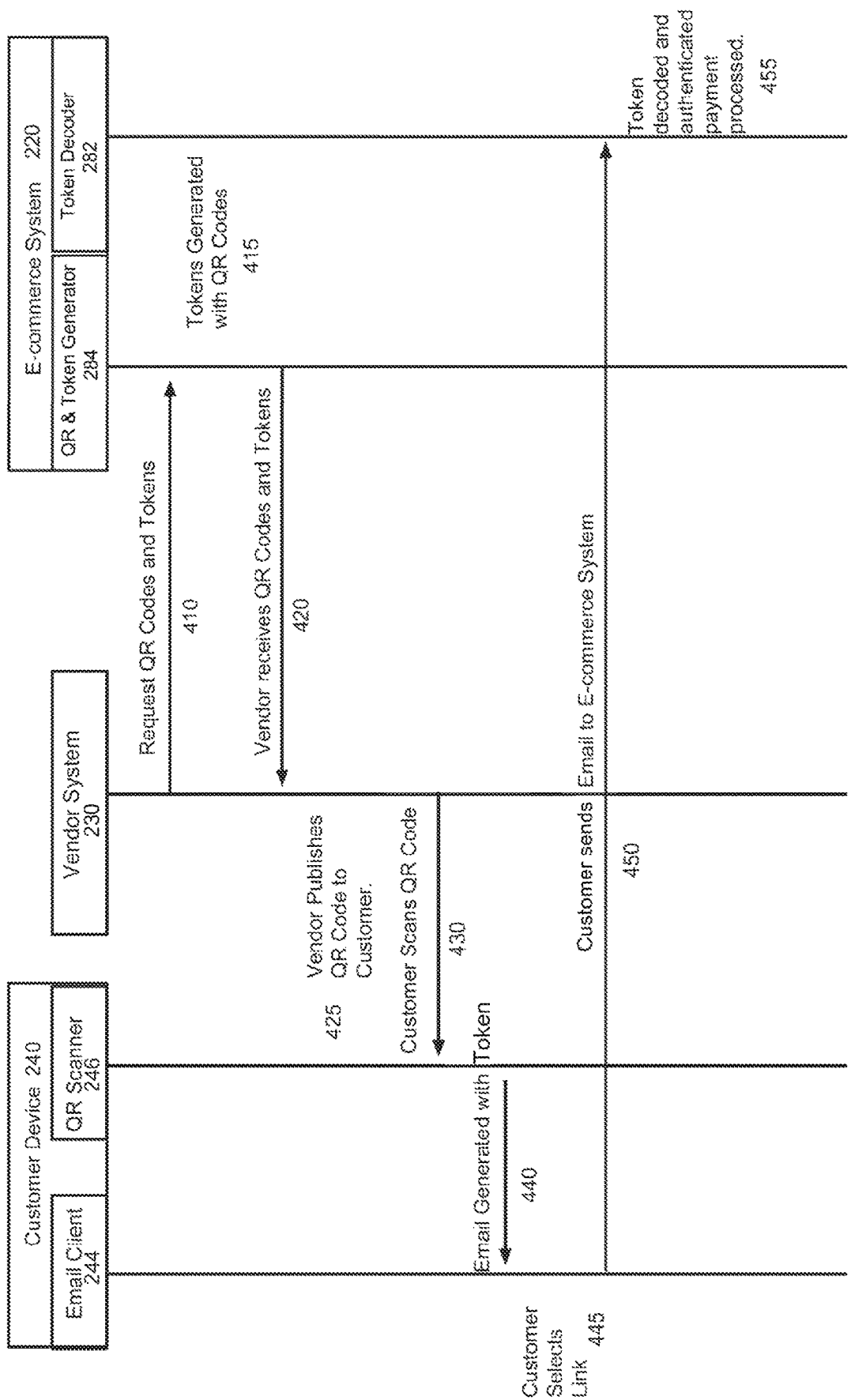

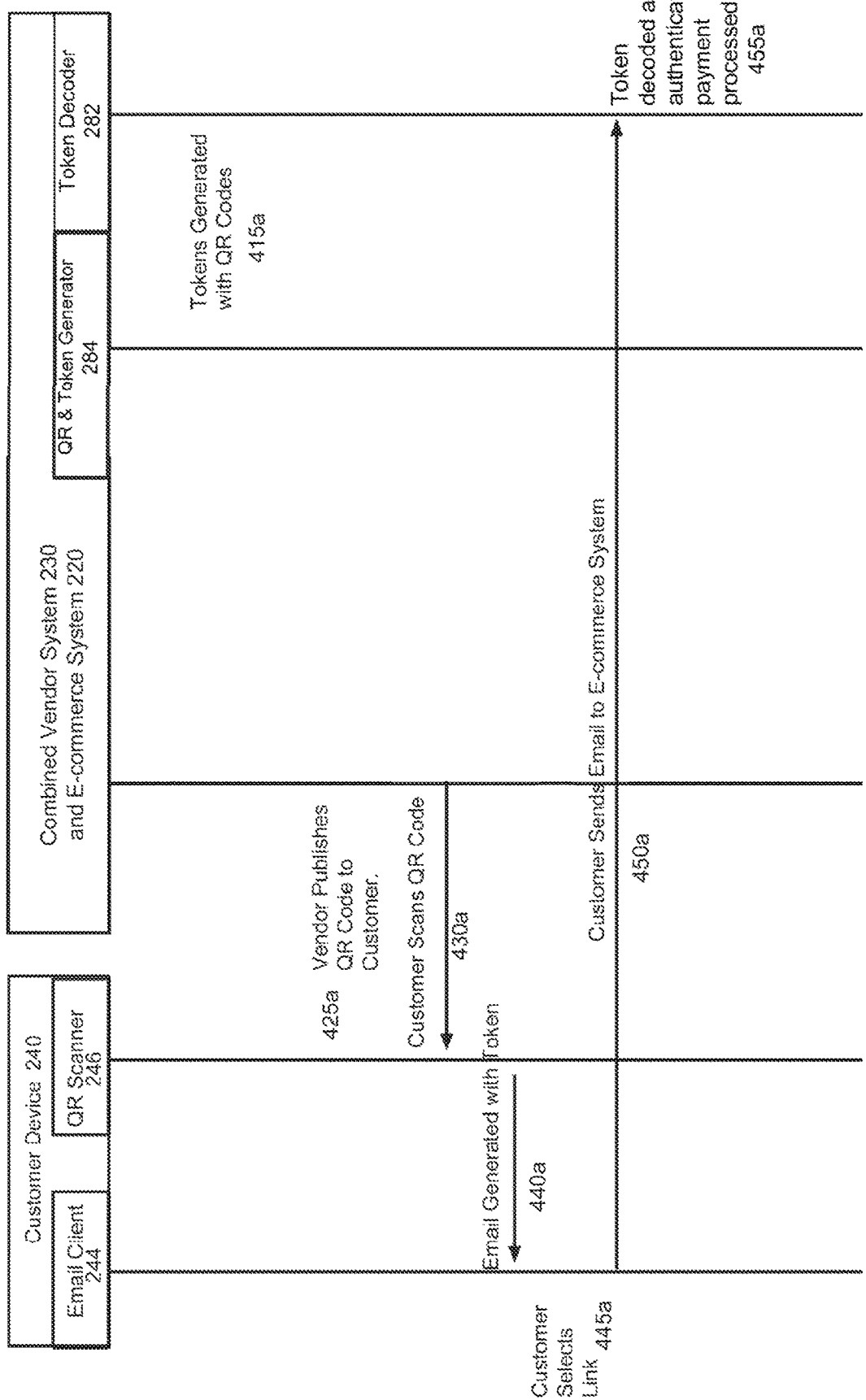

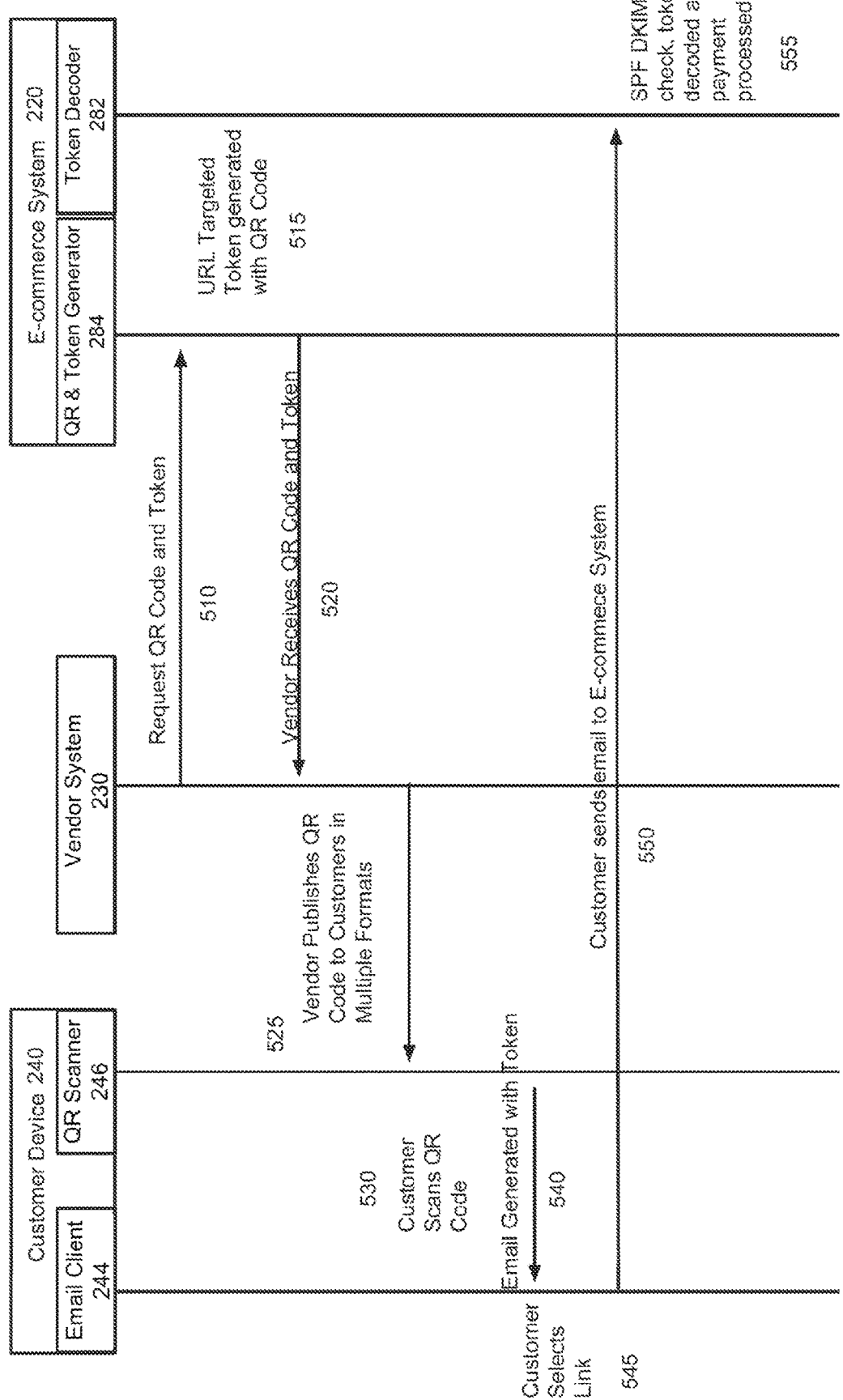

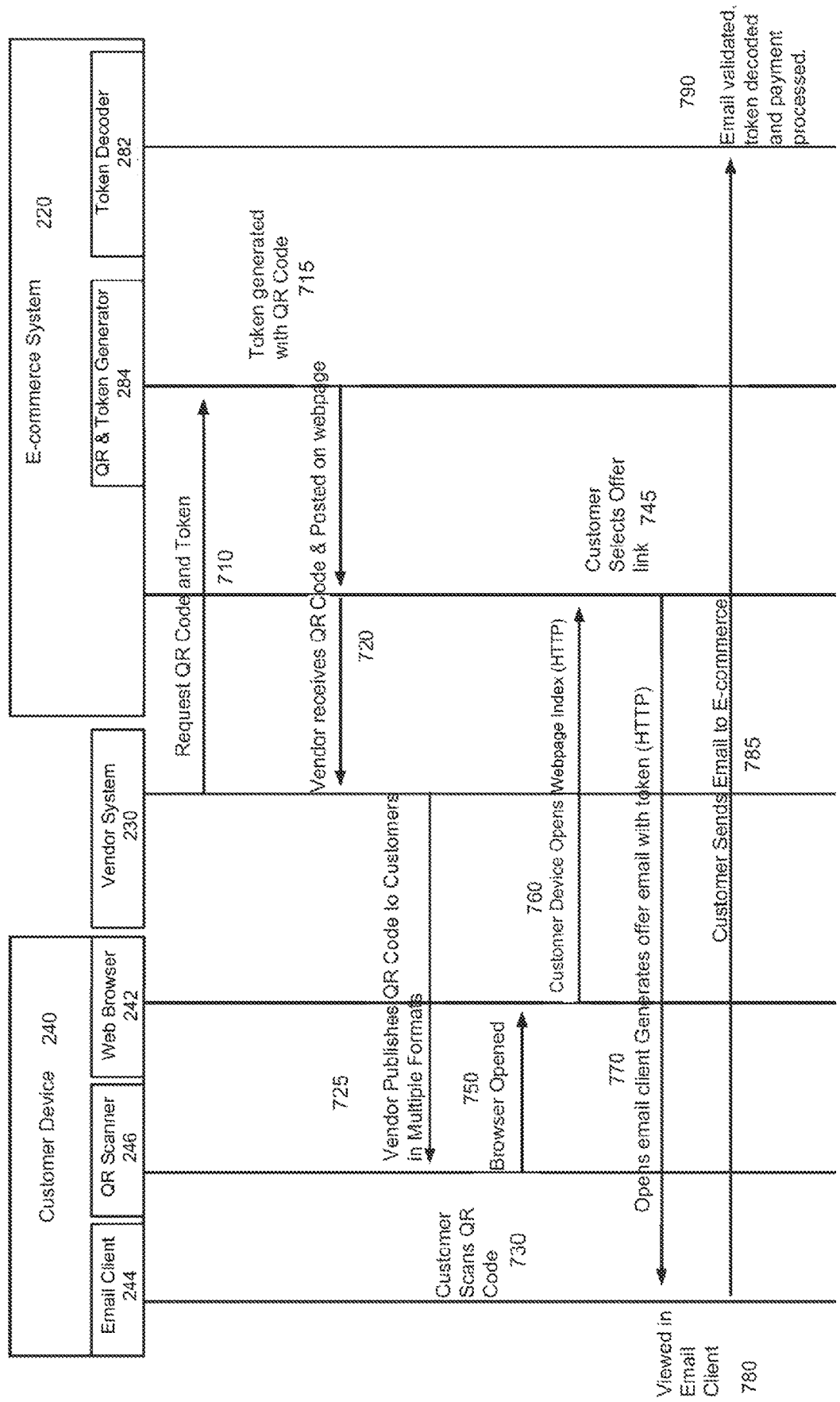

Paper Invoice — 800

FIG. 8

Gotham Power

Robert Jones
Your Electric Bill

Account Number : 45-100100-2502

Your Meter reading date: Monday, Aug 11 2014

Contact Us
www.gothampower.com
1 800 222 4444

Report a Problem
1 800 222 4444

Your billing Summary

Your new charges

| | |
|---|---|
| Electric supply charges | 57.11 |
| Gotham electric charges | 72.79 |
| Electric gas supply charges | 3.72 |
| Gotham gas charges | 22.30 |
| Total Amount Due | 155.92 |

Pay by Email

Scan this Code and send email to approve payment.

810

Gotham Power

Robert Jones
100 First Ave, Apt 3N
New York NY 10011

Total Amount Due    155.92

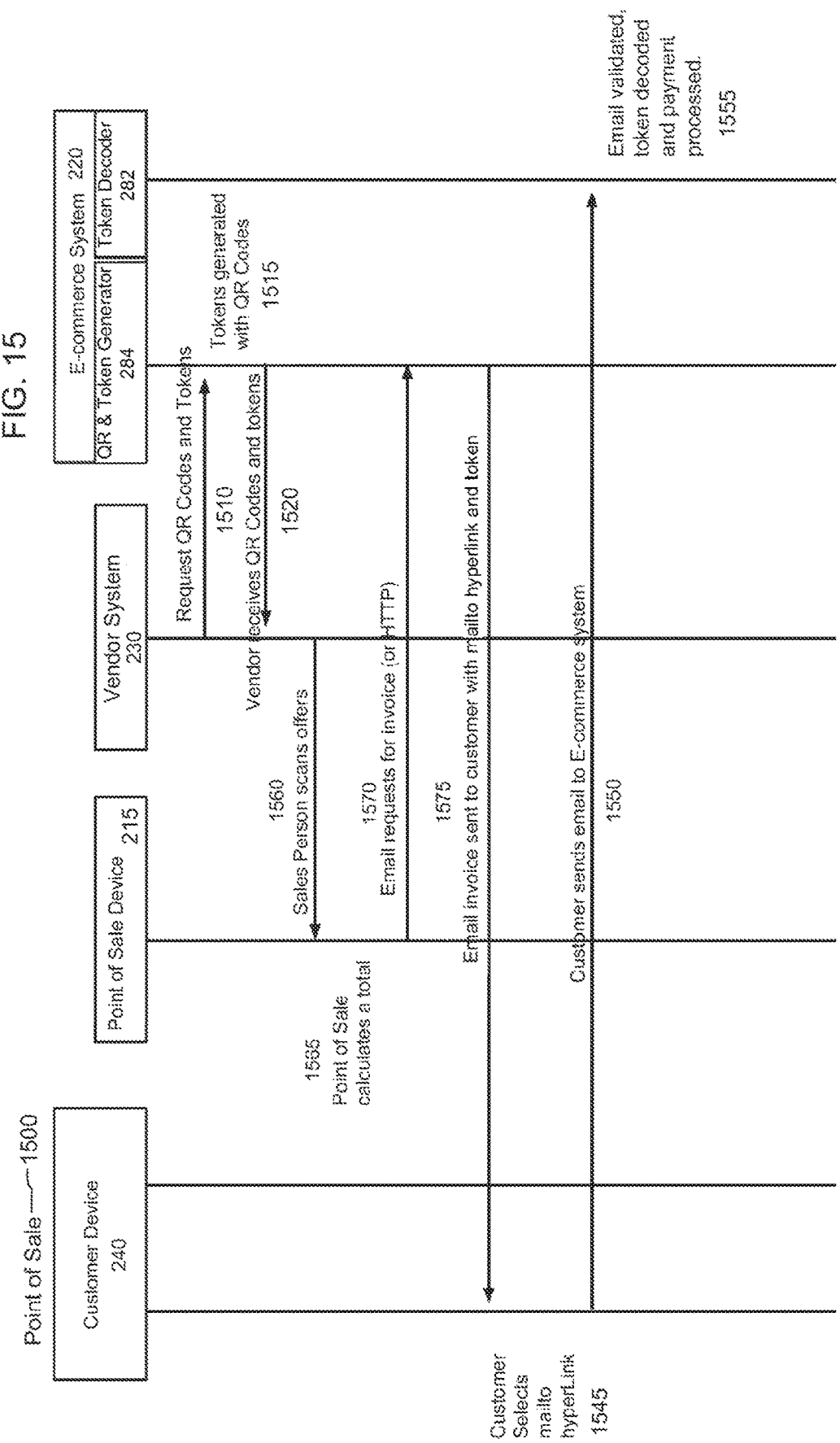

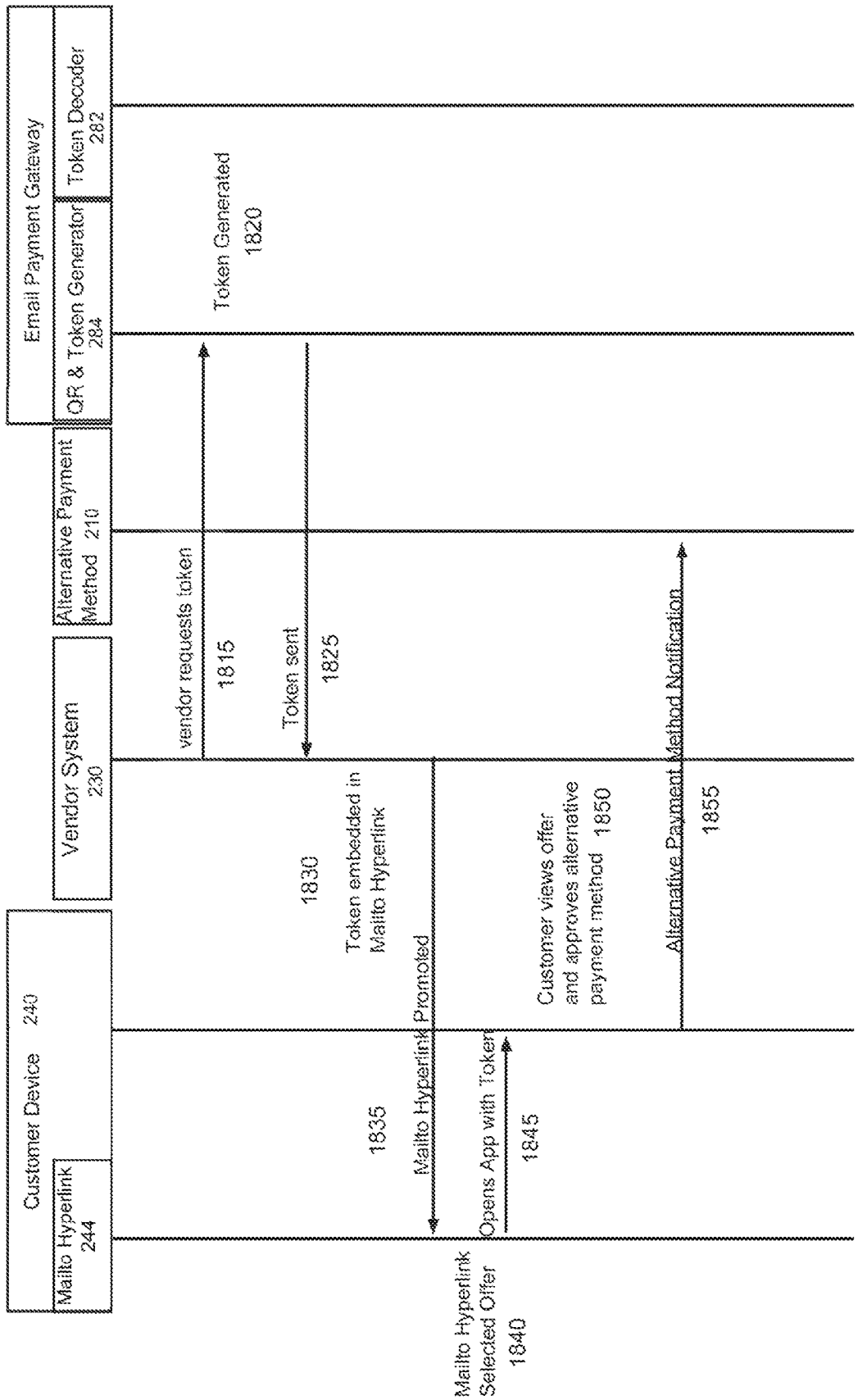

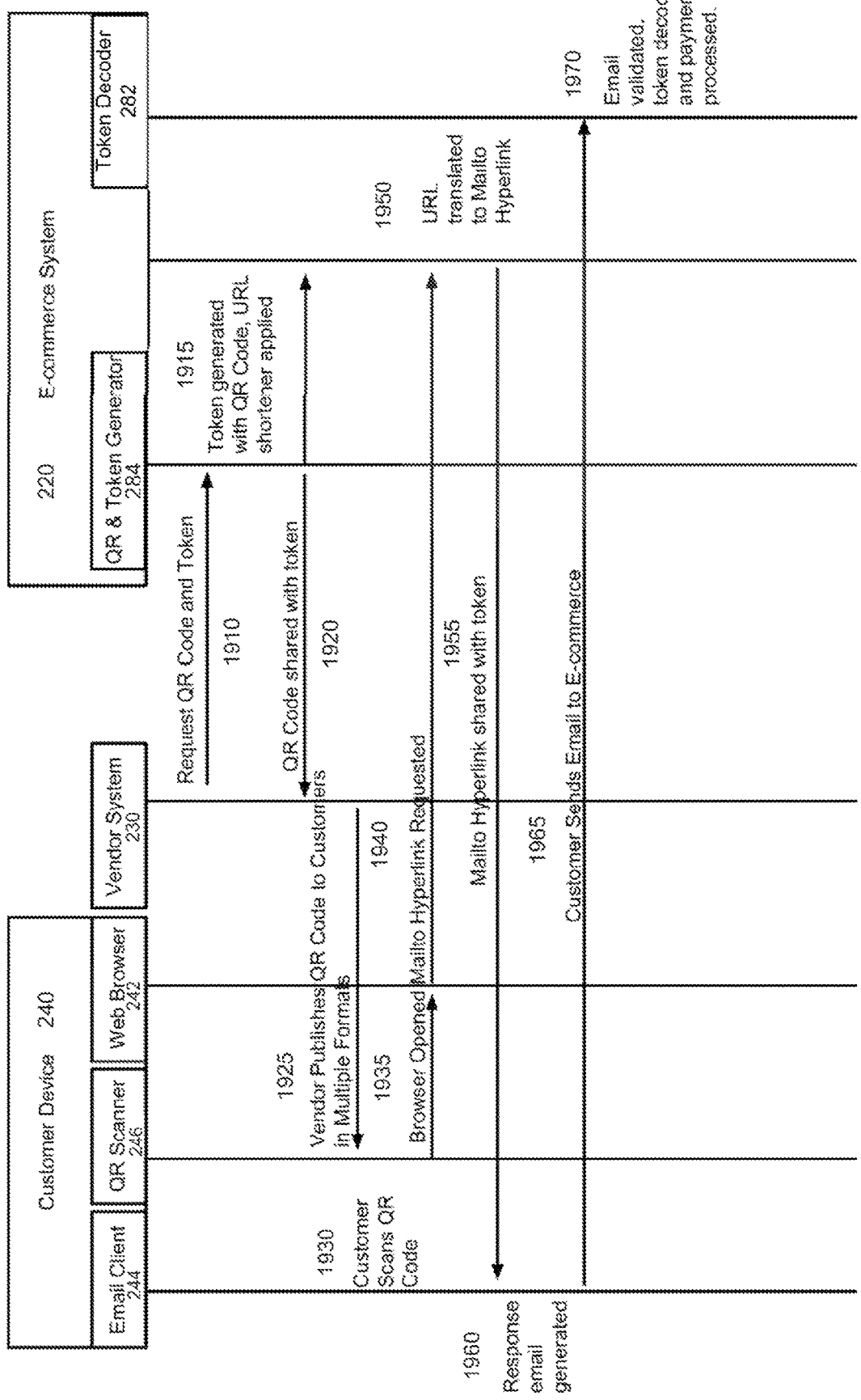

2000

EMAIL BASED E-COMMERCE WITH QR CODE BARCODE, IMAGE RECOGNITION ALTERNATIVE PAYMENT METHOD AND BIOMETRICS

CROSS REFERENCE TO RELATED APPLICATIONS

This application is a Continuation of U.S. patent application Ser. No. 15/110,662 filed Jul. 8, 2016, which is a 371 of PCT/US0214/072279 filed Dec. 23, 2014.

This application also claims the benefit of Application No. 61/925,409 filed on Jan. 9, 2014 and entitled MULTIPART AND MIXED/MULTIPART EMAIL-BASED E-COMMERCE, and Application No. 62/096,440 filed on Dec. 23, 2014, which applications are incorporated by reference as if fully set forth.

FIELD OF INVENTION

The present invention is related to electronic commerce systems. More particularly, the present invention is a system and method that facilitates electronic commerce by using one or more MIME Multipart or Mixed/Multipart messages.

BACKGROUND

In the current climate of smartphone, telecommunications and online networks there is an ever growing web of systems by which people and systems may communicate. Initially, networks were dominated by text-based interactions. Social networks in themselves provide many options, not to mention apps for smartphones, texting, chat rooms and blogs. Many capabilities grew to include images as part of users' interactions. This variety of networks is as varied as the reasons to use them, and many are not mutually exclusive to one another. Businesses and organizations are in a constant competition to maintain members and users across this variety of networks.

Quick Response (QR) codes and barcodes have been used by a wide variety of online vendors and organizations. Hits on a website, amount of opened emails, number of members, quantity of "likes" and tweets are some of the measures of success for businesses to gauge the number followers and the depth of their enthusiasm. Although all of these are a good way to advertise, there still remains little alternative to the actual payment process a user needs to perform in order to make a purchase. Going to a website, inputting information and generating a password is still the dominant method for paying for things online.

Within this technological climate, email still remains a perennial technology for electronic messaging. Many use email in tandem with other networks and for more official correspondence. The vast majority of services, websites, social networks and online retailers require an email address as the basis for joining and confirming identity. Email is an underutilized tool that is too often thought of as a place to write messages and correspond with others, or as a way to advertise to potential customers. However, email has not developed into a seamless vehicle to sell products or to perform a financial transaction.

Advertising emails use photography and graphics to promote products and raise money for organizations. However, they are primarily tools for enticement since they encourage customers to either go to a webpage or visit a store to complete a transaction, and are not directly related to the payment process. The need to move beyond Simple Mail Transfer Protocol (SMTP) has not led to further innovation in financial transactions. Multipurpose Internet Mail Extensions (MIME) are also underutilized and not used for secure financial transactions. The online marketplace does not yet have a coherent integration of email attachments within email-based transaction.

Currently, technology for performing financial transactions online such as electronic purchases, donation or paying bills is cumbersome and complicated. Usernames and passwords are required on virtually all services and each transaction. A service that utilizes the secure environment of the customers' email client as a method to validate payment would remove a major annoyance to customers and remove barriers from their purchases. Vendors would welcome increased contact and the capacity to close a sale using the email client.

Additionally, the use of QR codes, barcodes, and image recognition aids customers in locating information online and helps advertise sales information. However, QR codes have not been utilized outside of the advertisement environment.

SUMMARY

A method implemented in an e-commerce system to facilitate transactions between a customer and a vendor is disclosed. The method includes generating the requested at least one QR code and token, wherein the at least one QR code and token includes at least an email field, transmitting the at least one QR code and token, receiving a response email, wherein the response email includes the token, decoding, the token, performing a validation, and processing the transaction, on a condition that the validation(s) are approved.

An e-commerce system to facilitate transactions between a customer and a vendor is disclosed. The e-commerce system includes a receiver configured to receive a request for at least one QR code and token for use in an advertising campaign, a processor configured to generate at least one QR code and token, wherein the at least one QR code and token includes at least an email field, a transmitter configured to transmit the at least one QR code and token to a vendor server, the receiver configured to receive a response email, wherein the response email includes the token, the processor configured to decode the token, the processor configured to perform a validation, and the processor configured to process the financial transaction, on a condition that the validation(s) are approved.

A method implemented in a vendor system for transactions between a customer and a vendor facilitated by an e-commerce system is disclosed. The method includes transmitting, by a transmitter, a request for at least one QR code and token for use in an advertising campaign, receiving, by a receiver, the at least one QR code and token, wherein the at least one QR code and token includes at least one email field, transmitting, by a transmitter, a plurality of advertisement emails to a list of recipients, wherein the list of recipients includes registered and non-registered individuals, the advertisement emails including a mailto link that includes the at least one QR code and token, receiving, by the receiver, a notification message, wherein the notification message includes a confirmation that a transaction has been processed based on one of the transmitted plurality of advertisement emails, and executing an order for a customer in response to the received notification message.

BRIEF DESCRIPTION OF THE DRAWINGS

A more detailed understanding may be had from the following description, given by way of example in conjunction with the accompanying drawings wherein:

FIG. 1 illustrates a transactional flow diagram of a basic transaction where an email-based e-commerce system acquires information from the vendor to complete transaction;

FIG. 4 illustrates a transactional flow diagram for using a QR code with an email-based e-commerce system using email targeted tokens;

FIG. 4a illustrates a transactional flow diagram for using a QR code with an email-based e-commerce system having a combined vendor system and e-commerce system using email targeted tokens;

FIG. 5 illustrates a transactional flow diagram for using a QR code with an email-based e-commerce system using URL targeted tokens;

FIG. 7 illustrates a transactional flow diagram for QR code with additional step of URL product selection page;

FIG. 8 illustrates an example printed utility bill with QR code;

FIG. 15 illustrates a transactional flow diagram for application that is a cashier QR code/barcode reader with email client for email-based e-commerce transactions;

FIG. 16c illustrates a transactional flow diagram for alternative payment methods;

FIG. 17 illustrates a transactional flow diagram for a variation of a shortened QR code.

DETAILED DESCRIPTION OF THE PREFERRED EMBODIMENTS

Figure 1A:
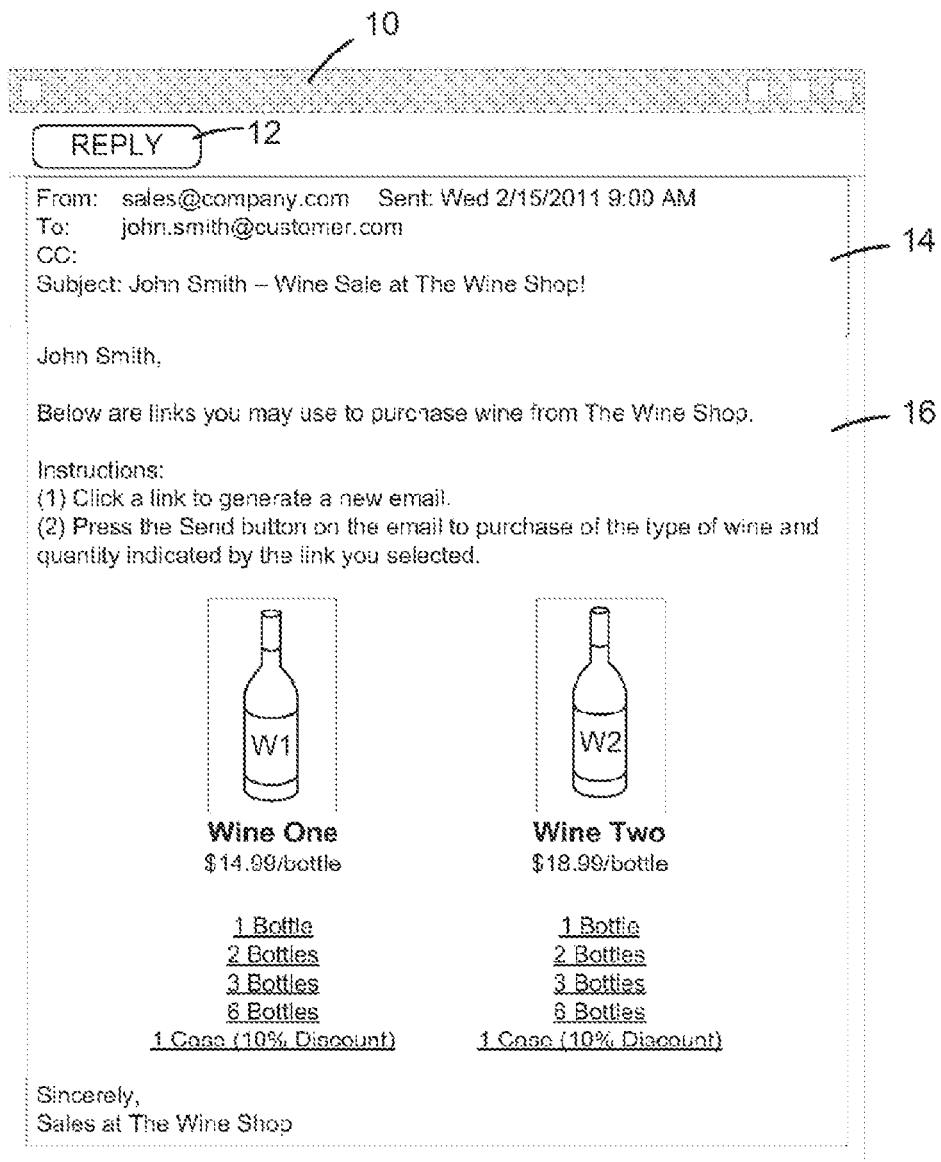
FIG. 1a illustrates an example advertisement email message that solicits the purchase of goods from a vendor.

All embodiments described below may be used in tandem or in relation to specific vendor needs. They may also be integrated with an email service provider or directly with a payment processor. Payment processing may occur in any number of ways using multiple gateways, credit cards, debit cards, direct carrier billing and automatic clearing houses. Although the description below focuses on the use of email messaging, social media networks may also be substituted. The configuration of the system may vary based on client needs. However, for the purposes of this application FIG. 1 represents one possible basic method and FIG. 2 represents one possible layout.

A method and apparatus allows the @Pay Email Payment Gateway, (referred to below as the e-commerce system), and/or associated vendors to generate Quick Response (QR) codes, barcodes, or other image recognition criteria that a vendor may use in advertisements or invoicing. QR codes, barcodes, or other such image recognition criteria that a vendor may use in advertisements or invoicing are hereafter referred to collectively as QR codes.

Generally, QR codes define a matrix barcode (or two-dimensional barcode). A barcode is a machine-readable optical label that contains information about the item which it represents. A type of QR code uses four standardized encoding modes (numeric, alphanumeric, byte/binary, and kanji) to efficiently store data. The QR code is known to include fast readability and greater storage capacity compared to standard barcodes. A QR code may include black modules (i.e., square dots) arranged in a square grid on a white background, which can be read by an imaging device, such as a camera or phone, for example, and processed using Reed-Solomon error correction until the image can be appropriately interpreted. The required data may be extracted from the patterns present in both horizontal and vertical components of the image.

These codes may be scanned using an application on a mobile device or other reader as described and a response email may be generated. There are several ways to initiate a transaction. In one example, the customer views an advertisement or other document that includes a QR code and scans the QR code. Scanning the QR code generates an email addressed to the e-commerce system. This email may include a token with additional information, including transaction details, for example. Generally, a token may be created using software such as Ruby or PHP. These tokens may include information about the merchant, the transaction amount, and the customer's e-mail address (if applicable).

Upon receipt of the email, the e-commerce system may perform checks to verify the email. Once verified, the payment may be processed. This process may also use image recognition aids that allow a product logo or location to be recognized and a response email may be generated to complete the transaction, or display to the customer choices for offers based on the recognized material.

In another embodiment, the e-commerce system may receive images such as QR codes and process the images and files once they arrive at the e-commerce system. The addition of these recognition technologies to the @Pay E-commerce systems enable greater flexibility and a wider array of product offers described below.

FIG. 1 illustrates a transactional flow diagram of a basic transaction where an email-based e-commerce system acquires information from the vendor to complete transaction 100. In this embodiment, a customer generates a response email to initiate a transaction at step 110. This response email may include a token as will be described herein. It should be noted that although the email is termed a "response" email, it need not be in response to any other email. In other words, the generation of a response email in step 110 may actually initiate the process for completing a transaction 100. An e-commerce system 220 is configured to receive 120 incoming email messages from customer device 240 that is requesting a transaction but requires additional information in order to process the payment. The e-commerce system 220 is configured to validate the incoming email message at step 130. The validation may include authentication using for example, protocols such as SPF and DKIM, and may include analyzing or otherwise decoding the token. It should be understood that although SPF and DKIM are specifically set forth herein, any type of "validation" procedure (i.e. one that ensures that the email is from the source that it indicates it is from) may be utilized. For example simply comparing the email address in the "From" field to a list may be a simple validation procedure. The token may have one identifier for the vendor or an identifier may be in any field. The identifier may be the email itself or some other identifier that is not a token.

Generally, Sender Policy Framework (SPF) is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is defined in IETF publication RFC 7208, which is incorporated by reference as if fully set forth.

The Simple Mail Transfer Protocol permits any computer to send email claiming to be from any source address. SPF allows the owner of an Internet domain to specify which computers are authorized to send mail with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DomainKeys Identified Mail (DKIM) is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and FastMail. Any mail from these organizations would typically carry a DKIM signature.

More specifically, both modules, signing and verifying, are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net;
  s=brisbane;
  c=relaxed/simple; q=dns/txt; l=1234; t=1117574938;
    x=1118006938;
  h=from:to:subject:date:keywords:keywords;
  bh=MTIzNDU2Nzg5MDEyMzQ1Njc4OTAxMj
    M0NTY3ODkwMTI=;
  b=dzdVyOfAKCdLXdJOc9G2q8LoXSlEniSbav+
    yuU4zGeeruD00lszZ VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:
v is the version,
a is the signing algorithm,
c is the canonicalization algorithm(s) for header and body,
q is the default query method,
l is the length of the canonicalized part of the body that has been signed,
t is the signature timestamp,
x is its expire time, and
h is the list of signed header fields, repeated for fields that occur multiple times.

The DKIM-Signature header field itself is always implicitly included in h.

The data returned from the query is also a list of tag-value pairs. It includes the domain's public key, along with other key usage tokens and flags. The receiver can use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message could not be proven should be made available to downstream and upstream processes. Methods for doing so may include sending back a message, or adding an Authentication-Results header field to the message as described in RFC 7001, which is incorporated as if fully set forth.

The e-commerce system 220 may notify the vendor system 230 that this email address is validated and that the customer has made the request at step 140. The vendor system 230 recognizes the email address and determines the transaction details 150. Such transaction details, for example, may be an amount to be charged. A response with the payment amount to be charged and any other additional information that might be required is generated at step 160. If there is a specific amount to be charged, the e-commerce system 220 processes the payment 170. The payment may be processed by the vendor 230 and/or the e-commerce system 220.

Alternatively or additionally, an additional email may be sent for a confirmation. A confirmation email may be sent to the customer's email address with a token embedded. The customer selects the mailto link to generate the email response message 185 addressed to the e-commerce system 220. The customer sends the email 190. When the e-commerce system 220 receives this email it is validated and the payment processed 195.

If the customer is not registered with the e-commerce system 220 or with the vendor system 230 further additional processing may be performed. An email may be sent to the customer with a URL link (not shown) to direct the customer to a sign-up page. When the customer selects the link, the customer is directed to a web-based sign up.

Method 100 illustrates a basic email payment to enable the presentation of a list of offers or payments that the customer and/or the vendor have knowledge of, such as monthly rent, utility bill, credit card minimum, for example, and the e-commerce system 220 serves to validate the customer's request for an offer, the capacity to reference the offers and payments list and process the payment.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a blind copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein.

Figure 2:
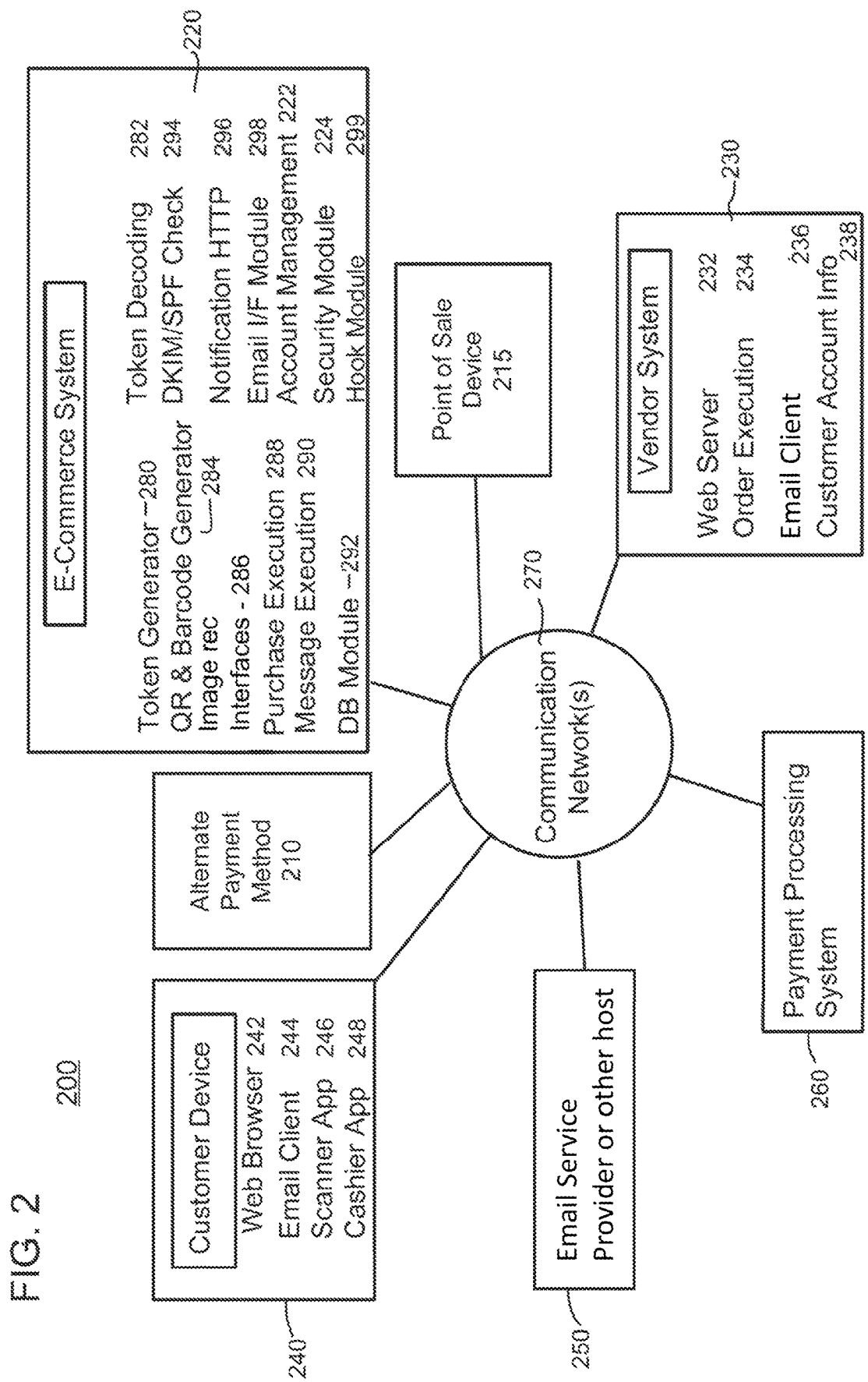
FIG. 2 illustrates a system diagram of an email-based QR and image recognition system.

In order to aid in understanding the present description, and for completeness, FIG. 1a illustrates an example email message that solicits the purchase of goods from a vendor. While any number of other actions including actions by a customer or user may initiate the transaction, this email message is used by way example only. Any type of transaction may also be performed within the present system, including, but not limited to, advertising, donation and bill payment for example. FIG. 1a shows an email display window 10 that may be used by the email client module (244 of FIG. 2 below) to display a first example email message from the message processing module. The email display window 10 may include a Reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the e-commerce system (220 of FIG. 2 below) for the communication of email messages. Further to this example, the control area 14 shows that the email address of the example recipient of the message (John Smith) is "john.smith@customer.com." The control area 14 may also display information such as a subject of the email message and the time the email message was sent. The Reply button 12 may respond to user input to generate a new display element (not depicted) to respond to the email message.

The message body area 16 may display the body of the email message. As shown in FIG. 1a, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate format, and each may describe a new email message that may be generated by the email client module 244 when that link is selected.

The "1 Bottle" link beneath the picture of the Wine One bottle may include information that describes an email message that, if received by the e-commerce system 220, will indicate to the e-commerce system 220 that John Smith would like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the e-commerce system 220, and that includes a message body that includes the identifier for John Smith ("0777"), an identifier of the selected product ("0005"), and an identifier of the quantity that John Smith would like to order (in this example, a single bottle).

Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the e-commerce system 220, will indicate to the e-commerce system 220 that John Smith would like to purchase two bottles of Wine One. According to this example, the "2 Bottles" link may be defined as follows:

<a href="mailto:sales@company.com?
subject=Purchase percent 20from percent 20Wine percent 20Shop percent 20 and
body=You percent 20have percent 20created percent 20an percent 20order percent 20for percent 20two percent 20bottles percent 20of percent 20Wine percent 20One. percent 20Press percent 20the percent 20Send percent 20button percent 20to percent 20complete percent 20the percent 20order. percent 0A percent 0AProductID0005 percent 20QualifierNA percent 20Qty0002 percent 20CustomerID0777 percent 20CampaignID0003"

target="_blank">2 Bottles</a>

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module 244 may receive a user input that indicates that one of the links displayed in the message body area 16 is selected. The user input may be, for example, a mouse click, keyboard input, or any other type of input that indicates that a link is selected. The email client module 244 may, in response to this user input, generate and display an order email message as specified by the selected link.

Figure 1B:
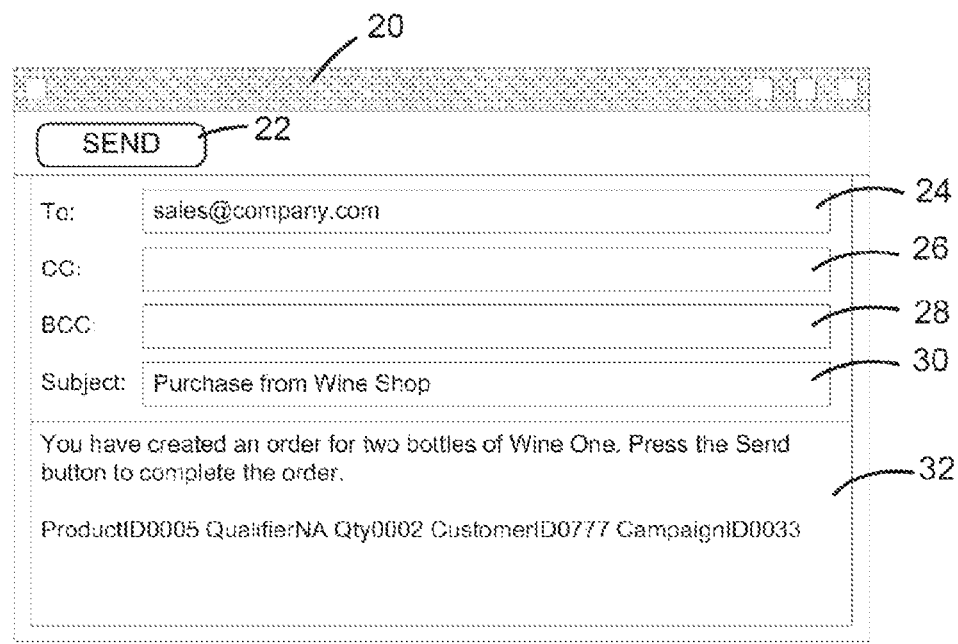
FIG. 1b illustrates an email message for placing an order.

FIG. 1b illustrates an email message for placing an order. FIG. 1b shows an example message composition window 20 that may be displayed in response to selection of a link from the message body area 16 of the email display window 10 of FIG. 1a. The message composition window 20 of FIG. 1b may include a Send button 22, a To area 24, a CC area 26, a BCC area 28, a Subject area 30, and a message body area 32. The Send button 22 in the message composition window 20 of FIG. 1b may be responsive to input from a user such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message. It should be noted that not all of these fields may be utilized.

FIG. 1b shows an example wherein the "2 Bottles" link beneath the picture of the Wine One and described above with reference to FIG. 1a is selected. The To area 24 indicates that the message is addressed to sales@company.com. The Subject area 30 indicates that the subject of the message is "Purchase from Wine Shop." The CC area 26 and BCC area 28 are blank. Continuing the example of FIG. 1b, Wine One product has a product identifier of "0005" and John Smith has a customer identifier of "0777." Accordingly, the message body area 32 includes the text "ProductID0005" and "CustomerID0777." The text presented herein are examples. The strings may include additional information such as vendor identifier, bill identifier, statement identifier, or account number, for example. To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 1a is selected, the display areas 24, 26, 28, 30, 32 in the message composition window 20 may include contents specified by the selected different link. For example, in an instance where a link related to Wine Two is selected, the message body area would not include the text "ProductID0005," but would include text that indicates the corresponding identifier for Wine Two.

Figure 1C:
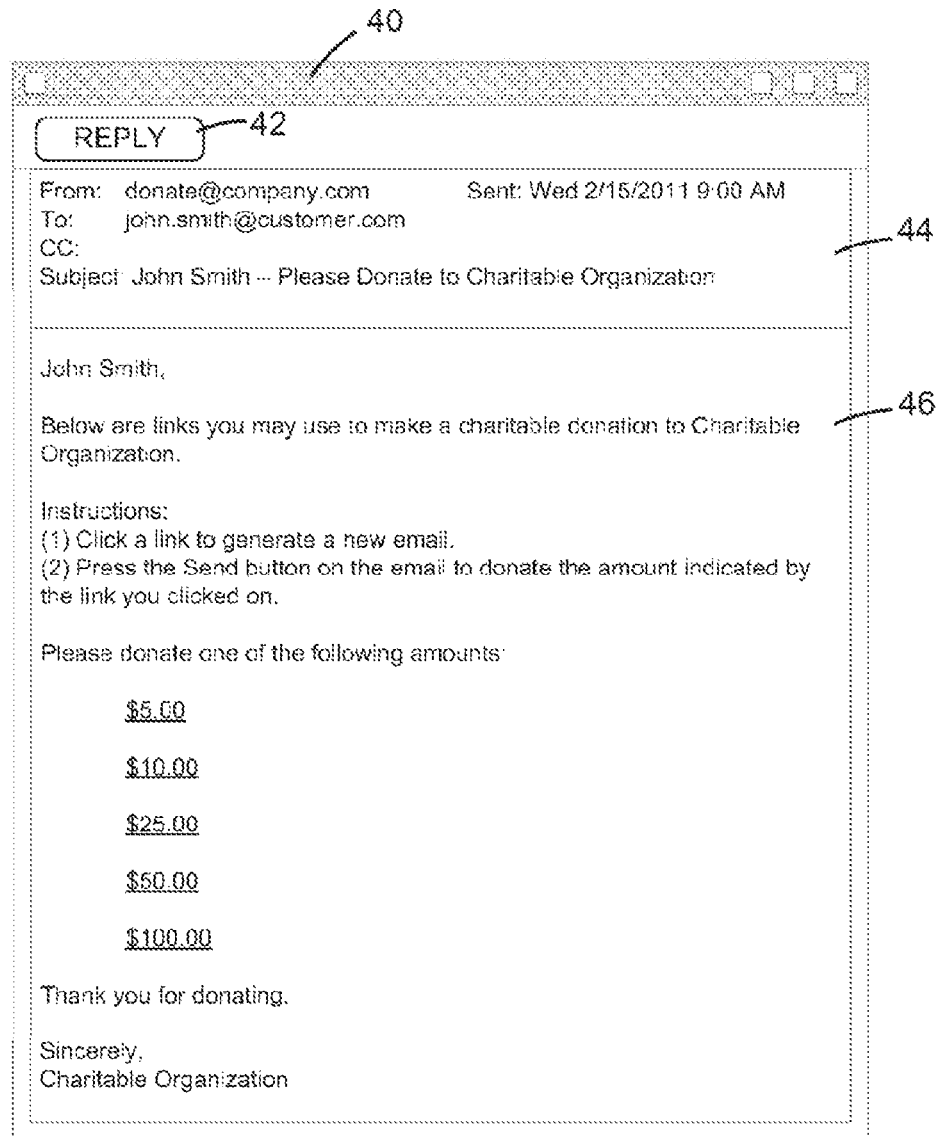
FIG. 1c illustrates an advertisement email message that solicits a donation.

FIG. 1c illustrates an advertisement email message that solicits a donation. FIG. 1c shows an email display window 40 that may be used by the email client module 244 to display a second example email message from the message processing module. The email display window 40 includes a Reply button 42, a control area 44, and a message body area 46. These display elements 42, 44, 46 may possess similar and/or analogous characteristics and/or perform similar functionality as corresponding display elements 22, 24, 26 in the email display window 20 of FIG. 1a. According to the example of FIG. 1c, the control area 44 shows that the sender of the message has the email address "donate@company.com." This is an email address that may be associated with an account used by the e-commerce system 220 for the communication of email messages. Further to this example, the control area 44 shows that the email address of the example recipient of the message (John Smith) is "john.smith@customer.com."

As shown in FIG. 1c, the message body area 46 of the email display window 40 may display an example email message that shows information related the solicitation of donations for an example non-profit organization ("Charitable Organization"). The message body area 46 also includes mailto links, such as the "$5.00," "$10.00," "$25.00," "$50.00," and "$100.00" links. These links may possess similar and/or analogous characteristics, and/or include similar and/or analogous information, as the mailto links described above with reference to FIG. 1a. The "$5.00" link describes an email message that, if received by the e-commerce system 220, will indicate to the e-commerce system 220 that John Smith would like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module 244 may receive a user input that indicates that one of the links displayed in the message body area 46 is selected. The email client module 244 may, in response to this user input, generate and display an order email message as specified by the selected link.

Figure 1D:
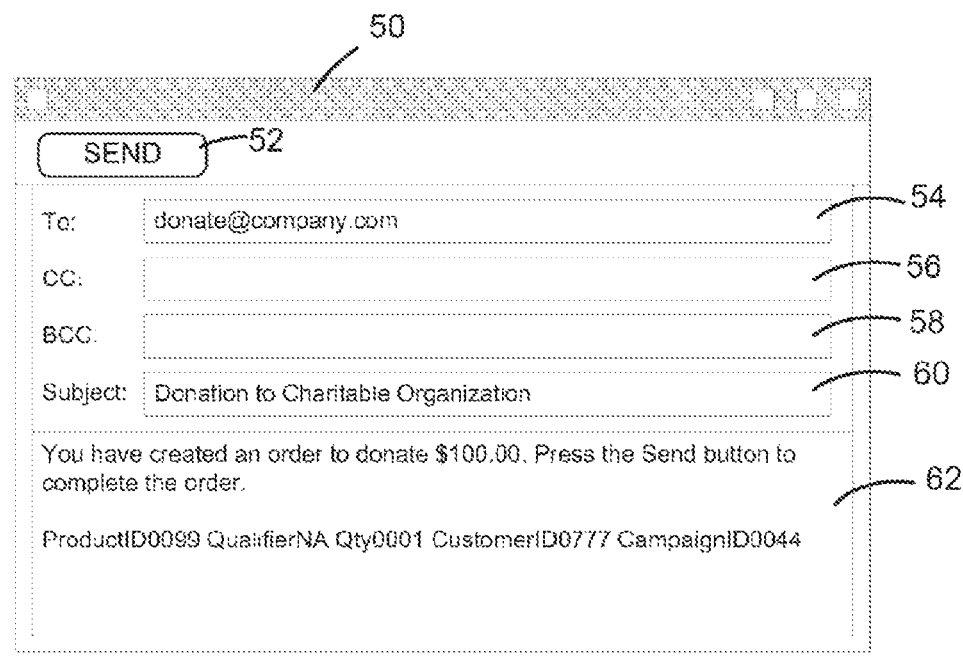
FIG. 1d illustrates an email message for initiating a donation.

FIG. 1d illustrates an email message for initiating a donation. FIG. 1d shows an example message composition window 50 that may be displayed in response to a selection of a link from the message body area 46 of the email display window 40 of FIG. 1b. The message composition window 50 of FIG. 1d may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display elements 22, 24, 26, 28, 30, 32 in the message composition window 20 of FIG. 1b.

FIG. 1d shows an example wherein the "$100.00" link from the message body area 46 of the email display window 40 of FIG. 1c is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044,"

indicating that the order is associated with an email campaign with an identifier of "0044."

The email client module 244 may send the generated order email message to the e-commerce system 220. This may be performed in response to input from a user of the customer client device (240 of FIG. 2). As one example, the email client module 244 may, in response to a selection of the Send button 52 in the message composition window 50 of FIG. 1d, transmit an order email message based on the contents of the fields 54, 56, 58, 60, 62 in the message composition window 50. As another example, the email client module 244 may, in response to a selection of the Send button 52 in the message composition window 50 of FIG. 1d, transmit an order email message based on the contents of the fields 54, 56, 58, 60, 62 in the message composition window 50.

FIG. 2 illustrates a system diagram of an email-based QR and image recognition system 200. The example system 200 shown in FIG. 2 may be used for e-commerce transactions. The example system 200 includes a vendor system 230, an e-commerce system 220, a customer device 240, a banking server (not shown), an email service provider 250, a point of sale device 215, an alternate payment device and a payment processing system 260 that may communicate over one or more wired and/or wireless communication networks 270. The wired or wireless communication networks 270 may be public, private or a combination of public or private networks.

The customer device 240 may be, for example, a cellular phone, a smartphone, a desktop computer, a laptop computer, a tablet computer, or any other appropriate computing device. The customer device 240 includes a processor, memory, a web browser unit 242 that may communicate data to/from the web server module(s) in the vendor system 230 and e-commerce system 220, an email client 244, a scanner application 246 and a cashier application 248. The web browser unit 242 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 242 may implement Rich Internet Application (RIA) and/or multimedia technologies such as ADOBE FLASH and/or other technologies compatible with Internet based communications. The web browser unit 242 may implement RIA and/or multimedia technologies using one or web browser plug-in modules (e.g., ADOBE FLASH), and/or using one or more sub-modules within the web browser unit 242 itself. The web browser unit 242 may display data on one or more display devices that are included in, or connected to, the customer device 240, such as a liquid crystal display (LCD) display or monitor. The customer device 240 may receive input from the user of the customer device 240 from input devices (not depicted) that are included in, or connected to, the customer device 240, such as a keyboard, a mouse, a microphone or a touch screen, and provide data that indicates the input to the web browser unit 242.

The vendor system 230 may include a web server 232, an order execution unit 234, a processor, memory, customer account information 238, and an email client 236.

The web server 232 provides a website that may be accessed by a customer device 240. The web server 232 may implement the HTTP protocol, and may communicate Hypertext Markup Language (HTML) pages and related data from the website to/from the customer device 240 using HTTP. The vendor system 230 may be connected to one or more private or public networks (such as the Internet), via which the web server 232 communicates with devices such as the customer device 240. The web server 232 may generate one or more web pages and may communicate the web pages to the customer device 240, and may receive responsive information from the customer device 240.

The vendor system 230 may also include one or more additional components or modules (not depicted), such as one or more load balancers, firewall devices, routers, switches, and devices that handle power backup and data redundancy.

The order execution unit 234 is configured to receive instructions from received messages and executes orders on behalf of the vendor system 230.

The memory may be configured to store information associated with e-commerce transactions. This may include inventory information, information used to generate web pages, customer information, and other e-commerce data.

The email client 236 may access and manage the vendor's email.

The e-commerce system 220 may include a token generator 280, a QR generator 284, an interface module 286, a purchase execution module 288, a message execution module 290, a database module 292, a token decoder 282, a DKIM/SPF Check module 294, a notification HTTP module 296, an email interface module 298, a hook module 299 an account management unit 222 and a security module 224. While only one vendor system 230 is shown communicating with the e-commerce system 220, this is shown as an example only. The e-commerce system 220 may communicate with an internal or external email service provider 250 and an internal or external payment processing system 260. The e-commerce system 220 may communicate with multiple vendor systems 230. Similarly, vendors may register with the e-commerce system 220. The e-commerce system 220 may provide the vendor system 230 with a public key and private key to be used in token transaction in accordance with the methods described herein. When a transaction is attempted (e.g. for invoices and payments), the e-commerce system 220 decodes the token, authenticates the sender of the email, which may allow the transaction to be processed. A look-up may be performed by the e-commerce system 220. This look-up may take the form of a request hook, for example. While the e-commerce system 220 is depicted as a separate entity in FIG. 2, this is shown as an example only. The e-commerce system 220 may be controlled and/or co-located with the vendor system 230, and/or the email service provider 250.

The token generator 280 may generate tokens for use in e-commerce transactions. Tokens may be encrypted or plain text strings which contain information to perform a transaction when sent to the e-commerce system(s) 220. A token may be one or multiple encrypted strings, files, passwords, cyphers, plain text or other data which may contain information used to perform or authenticate a transaction. While FIG. 2 shows the token generator 280 as being a part of the e-commerce system 220, it may be hosted by any trusted party with access to the private key. For example, the banking server may include a token generator 280. A token may include one or more of the following parameters or other parameters not listed below:

a) private-key: The private key provided by the e-commerce system 220.

b) public-key: e-commerce system's 220 public key, provided by the e-commerce system 220.

c) auth-key: any additional data that may be used to authenticate the transaction, including, but not limited to, biometric identification, location data and other fraud detection systems.

d) partner-id: The partner ID given provided by the e-commerce system 220.

e) environment: The environment the vendor wants to generate buttons for. This distinguishes whether the token is being used in a testing environment or in the live environment (and running real transactions).

f) type: The type of token to generate (e.g. bulk, email-targeted, etc.). There are multiple types of tokens that a token generator may generate and decode. For example, site tokens may be used for website transactions, email tokens for two-click email payments, and universal tokens for email validations.

g) card: The card token associated with the recipient of this token. When a customer is registered with the e-commerce system 220, the vendor receives a credit card token—a unique identifier that references the specific card associated with that customer and vendor. When the vendor is generating a token to submit to e-commerce system 220, they may include the card token as a customer identifier.

h) email: The email associated with the receipt of this token.

i) URL: The Signup URL the recipient may go to if customer doesn't have payment information registered with e-commerce system 220.

j) amount: The amount a user should be charged for the transaction the token is generated for.

k) user-data: Data to pass back as a reference. This data may include custom data that the vendor may want to pass through the e-commerce system 220 and receive back when a transaction has completed. It may include an item reference number or SKU, customer address, or other piece of data that is not required by e-commerce system 220 to complete a transaction, but that the vendor wants associated with that transaction.

l) expires: Expiration date for token, integer value of seconds since epoch.

m) header-user-agent: The HTTP_USER_AGENT from the request header. HTTP headers are sent as part of a request from a customer's web browser unit 242 for a piece of information. These headers define the parameters that the web browser unit 242 is expecting to get back. The user-agent is the identifier of the software that is submitting the request—typically the identifier of the web browser unit 155 that is requesting the content.

n) header-accept-language: The HTTP_ACCEPT_LANGUAGE from the request header. The accept-language is the acceptable language for the response—e.g. the language in which the web browser unit 242 is requesting the content be sent back.

o) header-accept-charset: The HTTP_ACCEPT_CHARSET from the request header. The accept-charset is the character sets that are acceptable for the response—e.g. the character set in which the web browser unit 242 is requesting the content be sent back.

p) ip-address: The IP address of the token recipient.

In one example, a bulk token may be used. A bulk token is a token that may not include nor rely on specifics about the customer, for example. In this regard, a bulk token may omit the card and email fields, allowing for the tokens to be shared. Additionally, or alternatively, a bulk token may include the card field and/or email field but the e-commerce system 220 may be configured to ignore those fields and/or other fields based on the type field.

By way of example, two architectures for tokens are further described below. The architectures include shared secret and public-key cryptography.

For a shared secret architecture, an administrator may generate a configuration file for each end-user. This file may be unique for each user. The file may include a username, a personal identification number, and the secret, for example. This configuration file is given to the user. Any token that uses shared secrets and stores the PIN alongside the shared secret in a software client can be stolen and subjected to offline attacks. Shared secret tokens can be difficult to distribute, since each token is essentially a different piece of software. Each user must receive a copy of the secret, which can create time constraints.

Tokens may rely on public-key cryptography, or asymmetric cryptography. A PIN can be stored on a remote authentication server instead of with the token client, making a stolen token no good unless the PIN is known as well. If there are attempts made to guess the PIN, it can be detected and logged on the authentication server, which can disable the token. Using asymmetric cryptography also simplifies implementation, since the token client can generate its own key pair and exchange public keys with the server.

The image interfaces module 286 serves as an interface to databases within the e-commerce system 220.

The purchase execution module 288 facilitates the execution of purchases between a customer and a vendor.

The message execution module 290 is configured to analyze received messages and communicate with the token decoder 282 to determine if the received message is valid and to identify the request embedded in the message (e.g. request for purchase of goods.) If the token decoder 282 indicates the token is valid, the message execution module 290 may then access the account management unit 222 to verify a transaction.

The database module 292 serves as a database to store information that may be accessed by the e-commerce system 220.

The token decoder 282 may be configured to decode tokens received from external sources, such as a vendor system 230 or a customer device 240.

The DomainKeys Identified Mail (DKIM)/Sender Policy Framework (SPF) check module 294 serves to authenticate received emails, using DKIM and/or SPF protocols. For example, SPF allows a domain owner to add a file or record on the server that the recipient server cross-checks. Similarly DKIM may be used to embed information within the email.

The notification HTTP module 296 delivers notices of events to external systems, such as an HTTP endpoint the vendor configures to update their internal database when a transaction is executed.

An email interface module 298 may be configured to parse emails for action by the e-commerce system 220.

The account management unit 222 is configured to manage accounts registered with the e-commerce system 220. A customer or vendor, wishing to complete a transaction with an e-commerce system 220 may register his/her email address and payment information with the e-commerce system 220. The account management unit 222 may be configured to store a customer registry and vendor registry.

The security module 224 may be configured to perform additional security measures to prevent unauthorized access to the system or fraud.

The email service provider 250 may be associated with the vendor system 230, the e-commerce system 220, or may be a third party entity. The email service provider 250 may be configured to provide email marketing services. The email service provider 250 may further be configured to provide tracking information showing the status of email sent to each member of an address list. The email service provider 250 may further be configured to segment an address list into interest groups or categories to send targeted information. The email service provider 250 may also parse messages based on the secondary system of email targeted tokens. The email service provider 250 may also be configured to send trigger emails based on responses from the vendor or customer behavior. The email service provider 250 may further be configured to create or use templates generated by the e-commerce system 220 for sending to contacts and/or the use of templates pre-made, email service provider 250 may include a user interface that allows a user to manually adjust the template or it may be integrated with external sources (e.g. vendor system 230 or e-commerce system 220). The email service provider 250 may comprise a send engine, which allows vendors to distribute their message to the customers. The email service provider 250 may further include a tool for generating mailto links, graphic buttons, and tokens. The email service provider 250 may be configured to customize dynamically the content of emails that are sent out, to tailor personalized information and mailto links.

The banking server may be controlled by a third party system bank. The e-commerce system 220 may communicate with the banking server to verify that the customer has adequate funds or credit for the requested purchase. For example, the banking server may be a controlled by VISA, AMERICAN EXPRESS, MASTERCARD or any other bank or banking or financial network that a customer may use for online payment. The banking server may be an interface for a centralized or decentralized virtual currency system or protocol such as frequent flyer miles, "reward" points, or Bitcoin.

Point of sale device 215 may include any device capable of interacting with system 200 for providing details of a transaction. Point of sale device 215 may include a cash register connected to e-commerce system 220 connected via communication network 270, for example.

Alternate payment device 210 may include another payment method for a customer. Alternate payment device 210 may be utilizes a different payment wallet or credit card or debit banking or clearing house, such as when making a payment and directing the payment to be made from an alternate payment device.

The email-based e-commerce system 220 may allow vendors to send advertising emails with one or more mailto-links associated with a specific product offer and select the mailto-link and generate a response email by selecting the mailto-link. This response email contains a token and is addressed to the e-commerce system 220. Once sent, this response email confirms the customer's purchase of the product or confirmation of a donation by parsing the information in the token. The e-commerce system 220 processes the payment and notifies the vendor and the customer. The e-commerce system 220 may comprise or include a token generator, components for processing the tokens and components for processing the payments and a system for notifying the vendor system 230 of the transaction details.

Referring back to the example system in FIG. 2, the payment processing system 260 may be an independent third party operated unit, it may be located in the e-commerce system 220 or the vendor system 230.

While the example system shown in FIG. 2 shows the e-commerce system 220 comprising the token generator 280, this is shown as an example only. The vendor system 230 may also include a token generator that allows vendors to directly create tokens. In another example, a third party may have a token generator to create tokens for use by the vendor system 230.

Figure 3:
FIG. 3 illustrates an example of a QR code.

Referring now to FIG. 3, which illustrates an example of a QR code 300. This QR code 300 may take the form of QR codes, barcodes, or other image recognition techniques. The QR code 300 may be placed by a vendor or other entity in advertisements or invoicing. In some embodiments, the QR codes 300 may be scanned using an application on a mobile device or other reader to generate a response email. The customer views the advertisement that includes a QR code 300 and scans the QR code 300. Scanning the QR code 300 generates an email addressed to the e-commerce system 220. This email contains a token with transaction details that allows the e-commerce system 220, upon receipt of the email, to perform certain checks and process the payment associated with the transaction.

Referring now also to FIG. 4, there is an illustration of a transactional flow diagram for using a QR code with an email-based e-commerce system 220 using email targeted tokens shown as method 400. A vendor system 230 requests QR codes and tokens at step 410. In response to the request, the e-commerce system 220 generates tokens with QR codes using the QR and token generator 284 at step 415. The vendor system 230 receives the QR codes and tokens from the e-commerce system 220 at step 420. The vendor system 230 publishes a QR code to a customer at step 425. The customer scans the QR code at step 430 using the customer device 240, such as by using the QR scanner 246. An email is generated with the token at step 440. Using the email client 244, the customer selects the link or sends the email at step 445. An email is then sent to the e-commerce system 220 at step 450. The token is decoded and authenticated and the payment is processed by the token decoder 282 of the e-commerce system 220 at step 455.

The email targeted token is encoded in a QR code 300. When a customer scans these codes at step 430, an email client 244 may be initiated to generate a response email at step 450 that is addressed to the e-commerce system 220 and has the required email targeted token. This token may be specific to the customer and may be tied to the email address of the customer. Such a specific token may require uniqueness in the specific QR code 300 that is provided.

It should be noted that in an alternate embodiment, the process may start at step 450, whereby the customer simply generates and sends an email to the e-commerce system 220. In this embodiment, if the user is registered with the e-commerce system 220, the system 220 validates the email and processes the financial transaction.

The e-commerce system 220 enables vendor system 230 to request the generation QR codes 300 at 410. These QR codes 300 may be encoded to generate emails for their customers and have those customers registered with the e-commerce system 220 so that the vendor system 230 and the customers via customer device 240 may perform email-based transactions via the e-commerce system 220. This enables the customer to complete a financial transaction by sending a response email confirming their intention to make a payment at step 450. The response email step 450 is generated using a QR code reader, a smart phone app or any reader technology.

Customers who are not registered may receive a separate email with URL web links that drive them to a signup page, but generally follow the method 400 described above with respect to FIG. 4. The registered customers received emails with mailto links that allow them to checkout by sending a response email at step 450. These QR codes are associated with products or offers of the vendor (collectively steps 420 and 425). When the QR code is scanned such as with QR scanner 246, the application opens the email client 244 and generates the response email that includes an email targeted token at step 440. To confirm the payment this response email is sent to the email e-commerce system 220 at step 450. The email is authenticated and the token decoded at step 455. These tokens depend on identifying the customer through their email address included in the fields of the email.

In this embodiment, the vendor system 230 or e-commerce system 220 may maintain "registered" and "unregistered" lists. In this embodiment, the e-commerce system 220 may enable vendors to generate QR codes that generate a response email when scanned. The customer does not need to receive an email advertisement, but may encounter the QR code in any number of places the vendor advertises, including printed or projected advertisements, mailers, bills, or invoices. In this embodiment, all registered members may receive a QR code with the information to complete a transaction. In this example, this information might be in a paper invoice mailed to the customer. The customer scans the QR code at step 430 which opens the email client 244 and generates the response email with the token at step 440 and is addressed to the e-commerce system 220. The customer device 240 then sends the email to the e-commerce system 220 at step 450 and the e-commerce system 220 decodes the token and processes the payment at step 455. The payment may also be processed by the vendor or third party.

In a related version of method 400, the QR code may contain more than one set of offers and the customer's scanning application may generate a selection of mailto links in one email or open a webpage with the selection. Once presented to the customer on customer device 240 for selection. The customer may then select a mailto link which generates a response email.

Referring now to FIG. 4a, the vendor system 230 and e-commerce system 220 may be one entity. In this situation, method 400A may depict the steps of method 400 of FIG. 4 modified to account for the combination of vendor system 230 and e-commerce system 220. Method 400a is an illustration of a transactional flow diagram for using a QR code with an email-based e-commerce system 220 using email targeted tokens with a combined vendor system 230 and e-commerce system 220. The combined vendor/e-commerce system generates tokens with QR codes using the QR generator and token generator 284 at step 415a. The combined vendor/e-commerce system publishes the QR code to a customer at step 425a. The customer scans the QR code at step 430a using the customer device 240, such as by using the QR scanner 246. An email is generated with the token at step 440a. Using the email client 244, the customer selects the link or sends the email at step 445a. An email is then sent to the combined vendor/e-commerce system at step 450a. The token is decoded and authenticated and the payment is processed by the token decoder 282 at step 455a.

Referring now to FIG. 5 there is an illustration of a transactional flow diagram for using a QR code with an email-based e-commerce system 220 using URL targeted tokens within method 500. This embodiment makes use of URL target tokens in different formats, such as QR code, to generate the response email. The response email is addressed to the e-commerce system 220 and contains a token with the offer information. The customer sends the response email to the e-commerce system 220. When the e-commerce system 220 receives the email it validates the identity of the sender employing a variety of email authentication techniques including, but not limited to, SPF and DKIM. The e-commerce system 220 then decodes the token and processes the payment. This token has all the information required to process the transaction. It is for a specific amount and uses the URL targeted token.

More specifically, a vendor system 230 requests QR codes and tokens at step 510. In response to the request, the e-commerce system 220 generates a bulk token with a QR code using the QR and token generator 284 at step 515. The vendor system 230 receives the QR codes and tokens from the e-commerce system 220 at step 520. The vendor system 230 publishes a QR code to a customer in one or more formats at step 525. The customer scans the QR code at step 530 using the customer device 240 using the QR scanner 246. An email is generated with the token at step 540. Using the email client 244, the customer selects the link at step 545. An email is then sent to the e-commerce system 220 at step 550. The email system may use URL targeted tokens or bulk tokens and authenticate email addresses using SPF/DKIM. The SPF/DKIM check occurs and the token is decoded and the payment is processed by the token decoder 282 of the e-commerce system 220 at step 555. The email-based e-commerce system 220 may receive the response email and perform a SPF/DKIM check to authenticate the sender of the email. Based on the result of the SPF/DKIM check, the e-commerce system 220 may continue processing the email.

In a related embodiment, the QR code or barcode may contain more than one set of offers and the customer's scanning application may generate a selection of mailto links or open a webpage with the selections. The customer would then select a mailto link and generate a response email with the required information.

The email-based e-commerce system 220 provides the vendor with the tools and access to generate the QR codes that are encoded with the tokens required for email-based transactions. This may be done on a web-based tool or via an API. The token generator 284 may generate tokens for use in e-commerce transactions. Tokens may be encrypted or plain text strings, which contain information to perform a transaction when sent to the e-commerce system(s) 220. A token may be one or multiple encrypted strings, files, passwords, cyphers, plain-text or other data which may contain information used to perform or authenticate a transaction. The email-based e-commerce system 220 may also encode those tokens and required information in a QR code graphic. The email-based e-commerce system 220 may allow vendors to include those QR codes and barcodes in any number of advertisements.

Figure 5A:
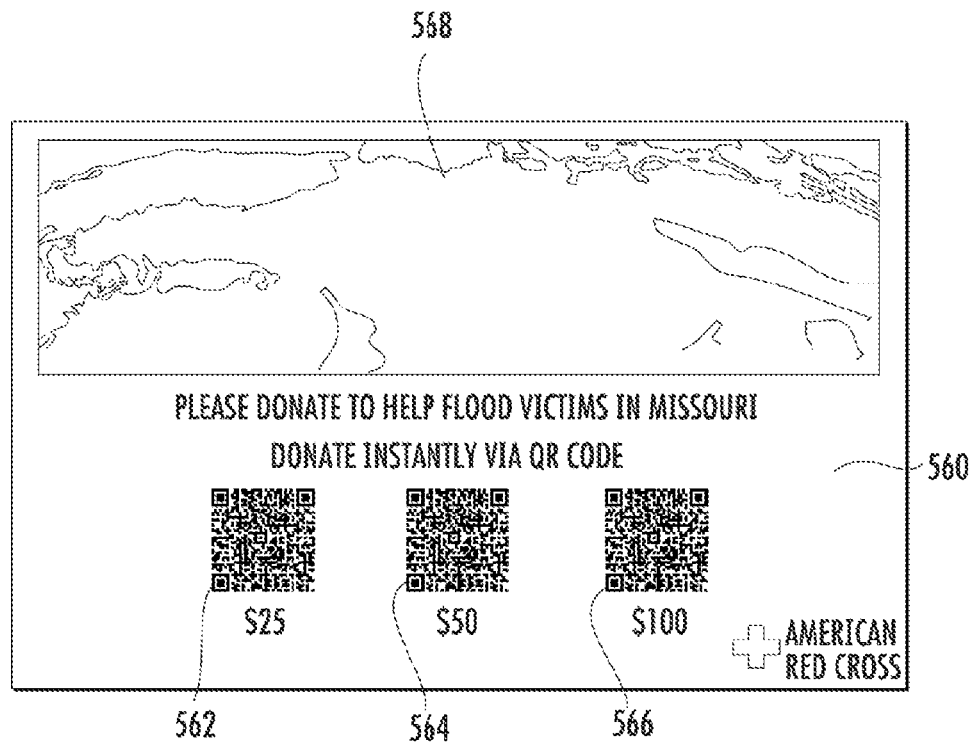
FIG. 5a illustrates an example of QR code advertisement with email-based e-commerce token.

Referring now additionally to FIG. 5a, there is an illustration of an example of QR code advertisement 560 with email-based e-commerce token. Multiple QR codes and barcodes 562, 564, 566 may be used for different amounts to be charged or for different products or variations on products. Because of the nature of bulk tokens and the @Pay authentication process, one QR code or barcode or image may work for all customers. Specifically, the illustration provides a picture of the flood in Missouri 568 with three instant donation amounts that are selectable and contain QR codes 562, 564, 566.

Figure 5B:
FIG. 5b illustrates an example of QR code smartphone reader of email-based e-commerce token.
Figure 5C:
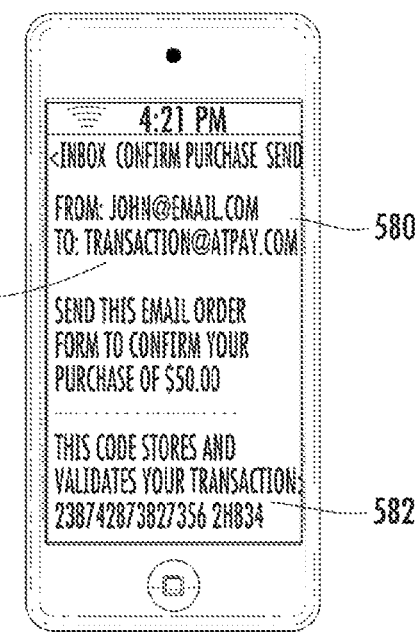
FIG. 5c illustrates an example of response email generated with token for email-based financial transaction.

Referring now also to FIG. 5b, which illustrates an example of QR code smartphone reader 570 of email-based e-commerce token, and FIG. 5c, which illustrates an example of response email 580 generated with token 582 for email-based financial transaction. When the customer scans the QR code shown in FIG. 5b, this automatically opens the email client and generates a response email addressed 584 to the email-based e-commerce system 220 as shown in FIG. 5c. This response email contains a token 582 and is addressed 584 to the e-commerce system 220. The token 582 may be visible or non-visible within the response email. Once sent, this response email confirms the customer's purchase of the product, donation or payment by parsing the information in the token 582. The e-commerce system 220 processes the payment and notifies the vendor and the customer.

Figure 6:
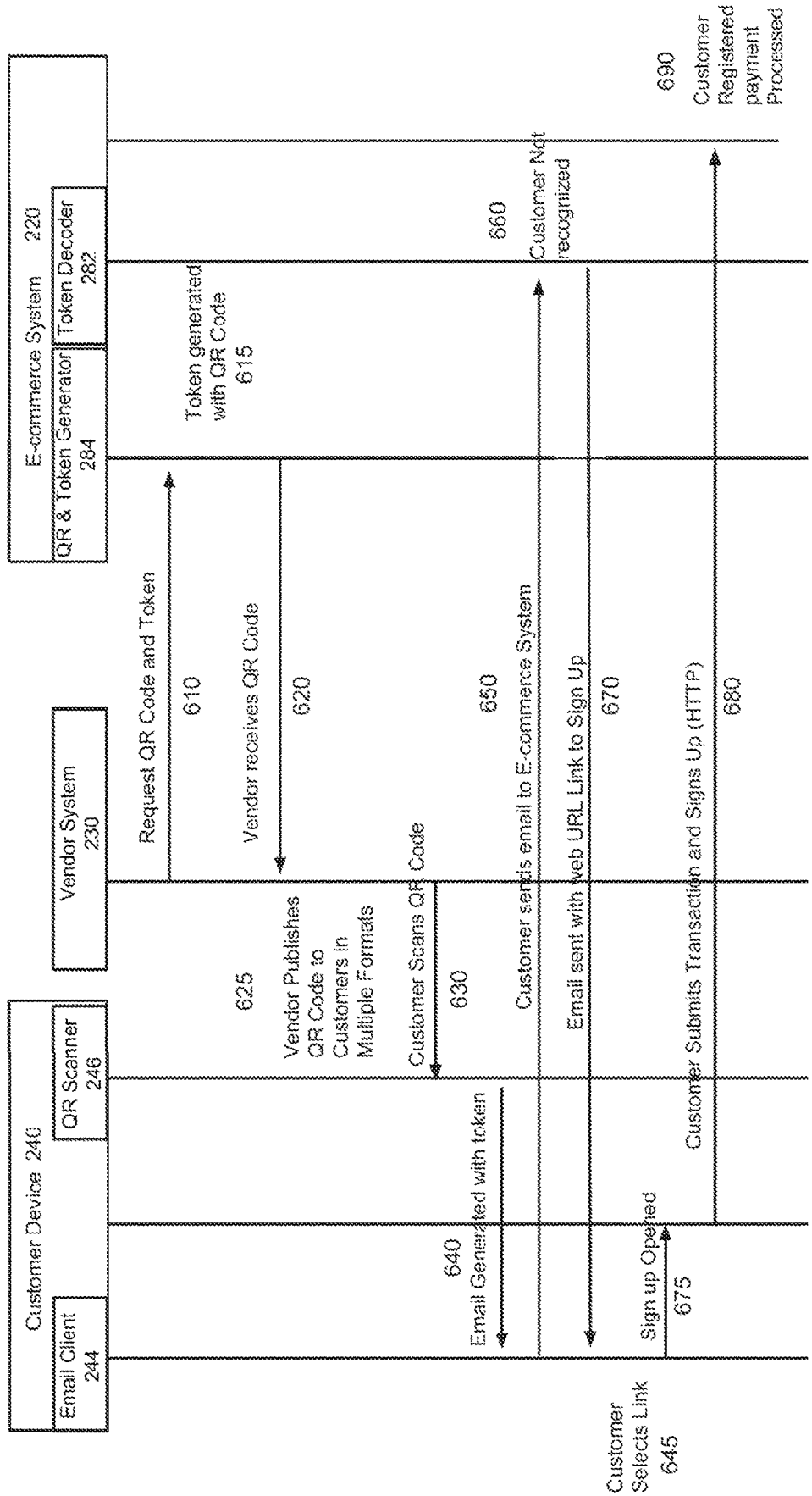
FIG. 6 illustrates a transactional flow diagram for using a QR code with an email-based e-commerce system using for a non-registered member.

FIG. 6 illustrates a transactional flow diagram illustrating the use of a QR code with an email-based e-commerce system 220 such as for use of a non-registered member in method 600. In a similar fashion to the method described with respect to FIG. 4, a vendor system 230 requests QR codes and tokens at step 610. In response to the request, the e-commerce system 220 generates tokens with QR codes using the QR and token generator 284 at step 615.

It should be understood that if the e-commerce system 220 is part of the vendor system 230, then steps 610 and 620 may be eliminated and the vendor system 230 may generate the tokens (i.e. step 615) on its own. This applies to the other methods described herein.

The vendor system 230 receives the QR codes and tokens from the e-commerce system 220 at step 620. The vendor system 230 publishes a QR code to a customer at step 625. The customer scans the QR code at step 630 using the customer device 240, such as by using the QR scanner 246. An email is generated with the token at step 640. If the e-commerce system 220 receives a response email 650 and determines that that it is non-registered 660, the e-commerce system 220 sends an email to that address that has a URL link 670. When the customer opens this email 675 and selects the URL link at step 645, it directs them to a web page signup where they may register and complete a transaction 680 allowing the payment to be processed at step 690.

Referring now to FIG. 7, which illustrates a transactional flow diagram for QR code with additional step of URL product selection page within method 700. Method 700 is initiated with a vendor system 230 requesting a QR code from the e-commerce system 220 at step 710. The QR code is generated with a QR code generator 284 at step 715. The e-commerce system 220 then sends the QR code to the vendor system 230 at step 720. The vendor published the QR code to its customers at step 725. The customers interact with the QR code using customer device's 240 QR scanner 246 at step 730. This interaction with the QR code may include scanning, for example. The interaction of step 730 may cause a browser to be opened at step 750 within the web browser 242 of customer device 240. This customer device 240 opens a webpage index within the browser at step 760. In method 700, the QR codes are used to drive the customer to an index of mailto links 745, such as displayed to the customer via the webpage, that when activated may generate a response email with a token 770. This index 745 may be viewed on a webpage or through an application 760. The application may be a mobile app or a desktop application. On this page the customer may view a selection of mailto links that give the customer multiple choices. The customer may select a mailto link 780 and generate the response email 785. The customer sends the response email to the e-commerce system 220. When the e-commerce system 220 receives the email 785 it validates the identity of the sender employing a variety of email authentication techniques including, but not limited to, SPF and DKIM. The e-commerce system 220 then decodes the token and processes the payment 790. The payment may also be processed by the vendor.

The e-commerce system 220 enables vendors to generate QR codes that are encoded to open an application with a selection of mailto links or generate web pages that have a selection or mailto links that when a mailto link is selected may generate an email, and have those customers register with the e-commerce system 220 so that the vendor and the customers may perform email-based transactions via the e-commerce system 220. This enables the customer to complete a financial transaction by sending a response email confirming their intention to make a payment. The response email is generated using a QR code or barcode reader or smart phone app or any reader technology.

Customers who are not registered may receive a separate email with URL web links that drive them to a signup page. The registered customers may scan QR codes and access the product selection page. These QR codes are associated with products or offers of the vendor. When the QR code or barcode is scanned, the application opens an application or opens a web browser that contains a list of possible purchases. Each purchase is associated with a mailto link. This link may be embedded behind an image.

While the present description describes a configuration where the link is embedded behind an image, the image may be the link, and the link may be configured where it is non-visible to the customer or otherwise link or connected to the image. When selected, the device's email client is opened and generates the response email that includes a token. To confirm the payment, the response email is sent to the email e-commerce system 220, the email is authenticated and the token decoded. These tokens depend on identifying the customer through their email address. In this embodiment the e-commerce system 220 may enable vendors to generate QR codes that when scanned may generate the response email.

The customer does not need to receive an email advertisement but may now encounter the QR code or barcode in any number of places the vendor advertises printed or projected. The customer then sends the email to the e-commerce system 220 and the e-commerce system 220 decodes the token and processes the payment. The payment may also be processed by the vendor or third party.

Figure 9:
FIG. 9 illustrates an example of a QR code and token generator web-based interface.
Figure 10:
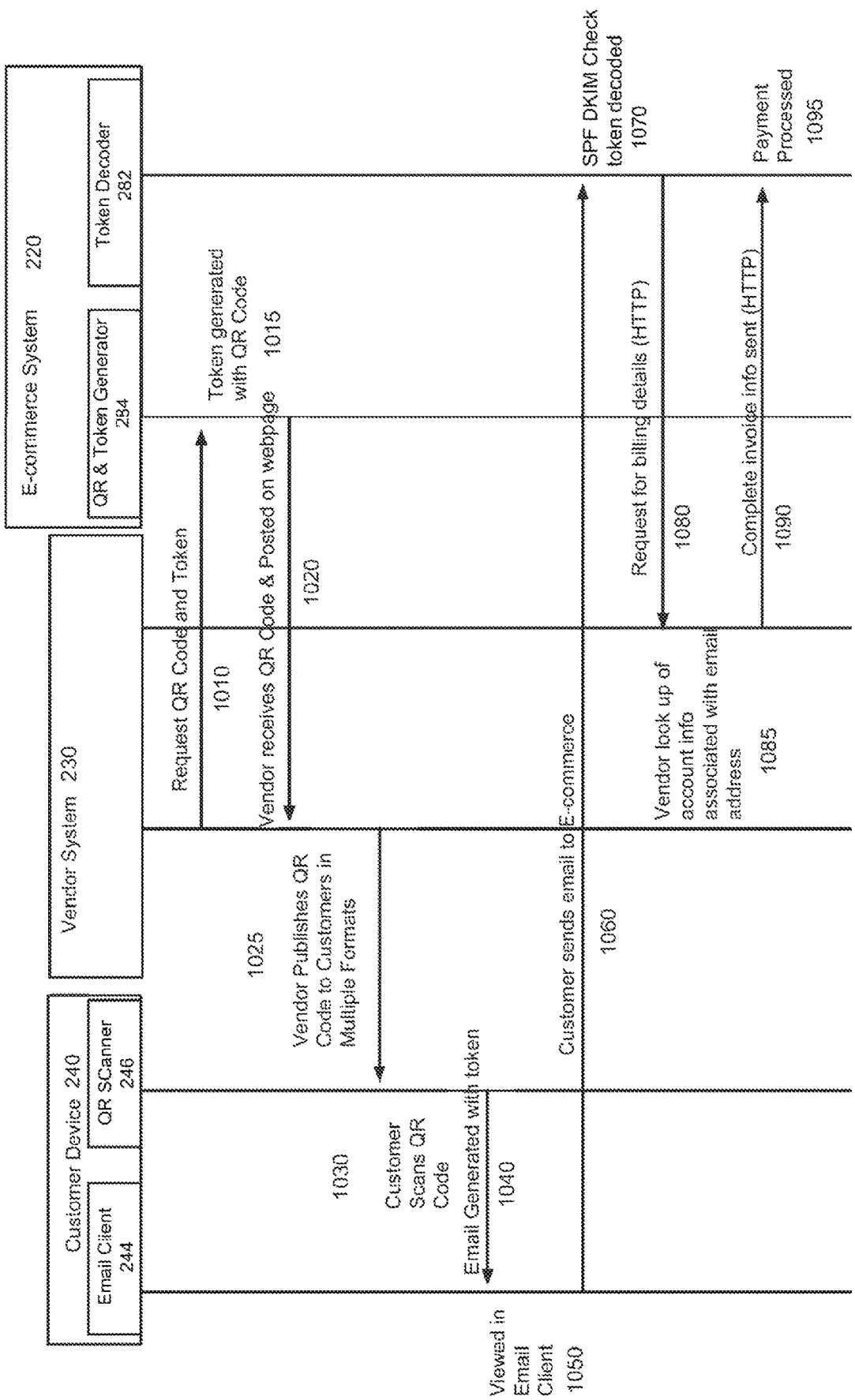
FIG. 10 illustrates a transactional flow diagram for one QR code that requires additional information once the email is received.

Referring collectively to FIGS. 8-10, there is shown an invoice including a QR code that may be used for any customer. This QR code requires additional information. In using this QR code with some additional information being required, the response email acts a request for payment (or other information).

In an alternative embodiment, an image, or even a word, may be sent by the customer to the e-commerce system 220. For example, a customer may email the word "Comcast" or "bill me" or email an image or other identifier to a specific email address. The token, in this example, may not specify the invoice total as it had in the other transactions described above. When the e-commerce system 220 receives the email, the email is validated including validating the identity of the sender, such as by employing a variety of email authentication techniques including, but not limited to, SPF and DKIM. The e-commerce system 220 then decodes the token, which may take the form of a bulk token, for example. The token may have an identifier, or the email address may be the identifier. The e-commerce system 220 may simply change the amount of the invoice via the customers' pre-authorized payment method or may request the missing amount to be charged (or any other required information) using a webhook.

The e-commerce system 220 may then process the transaction (or the vendor) or send a confirmation email with a token (email or URL based token). In this embodiment, there is a single identifier that may not need to be in a token but the identifier may be in any field or in the email address associated to that vendor, or may be an additional email address.

FIG. 8 illustrates an example printed or emailed utility bill 800 with QR code 810. A bulk token may be encoded into a QR code 810 with less than the required information since each customer may require different quantities or amounts. In this example, a vendor who is a utility company wants to invoice their customers. An example of an invoice 800 with an email-based QR code 810 may be found in FIG. 8. In this embodiment, the vendor knows all of the required information for the transaction and may require consent from the customer or otherwise require the customer to agree to the payment. That is, the vendor may know the payment amount, the customer account number, and the pertinent payment information for the customer, while requiring that the customer authorize that the payment transaction occur. The vendor generates as few as one QR code and uses it in all advertisements or invoices.

FIG. 9 illustrates an example of QR code and token generator web-based interface 900. The token and the QR code may be generated on a web-based interface or through and API integration.

FIG. 10 illustrates a transactional flow diagram shown as method 1000 for this embodiment. In method 1000, one QR code may be used for every customer with the QR code requiring additional information once the email is received as described. The vendor system 230, including a marketing system, requests a QR code and token from the e-commerce system 220, at step 1010. The requested QR code is generated by the QR and token generator 284 of e-commerce system 220, at step 1015. The vendor system 230 may receive the QR code and post on the webpage 1020. The vendor system 230 may publish this QR code to customers in multiple formats at step 1025.

A customer may scan the QR code at step 1030 using QR scanner 246 of customer device 240. An email is generated with the token at step 1040. The customer may view in the email client 244 of customer device 240 at step 1050. The customer sends an email to the e-commerce system 220 at step 1060. The e-commerce system 220 authenticates using a SPF/DKIM check at step 1070, or other email authentication technique, and when the token is decoded this signals that the customer has confirmed the transaction.

The e-commerce system 220 notifies the vendor electronically, in step 1080, as a request for billing details, such as the total amount to be charged. The vendor using the email address identifies the customer and determines the total amount to be charged at step 1085. Once determined, the vendor system 230, via an accounts system, for example, provides a complete invoice to the e-commerce system 220 at step 1090. The e-commerce system 220 then completes the payment at step 1095. The payment may alternatively be processed by the vendor or another party such as an email service provider. While not necessarily required, once the vendor and e-commerce system 220 determine the amount, an email may be sent to the customer that confirms the amount.

In this method, the e-commerce system 220 may utilize an existing index of offers (or invoices) that are familiar to customers either through advertising, invoices or email correspondence. This enables the email request for payment to be updated over time without changing the token or the QR code. A customer paying a bill may pay the bill each month using the same QR code or by sending the same response email.

A vendor, using the vendor server may compose a QR code with URL targeted tokens that do not have all of the necessary information for the transaction, but serve to authenticate the email address and to notify the vendor that the transaction may take place based on the vendors total for the customer. The vendor server requests, from the e-commerce system 220, a QR code to be used for an invoice, offer or advertisement. This may be, for example a URL targeted token. This request may be transmitted via an API, via an online interface, or generated with a system embedded within the vendor server or with an online interface or software or application.

The vendor server may receive these QR codes and integrate them into any number of invoices or advertising campaigns. For example, the customer may receive utility bill and on that bill may be printed the amount owed, also printed on this invoice is a QR code or barcode. (This QR or barcode be anywhere i.e. on a billboard, TV or magazine). A customer may scan these codes where they are displayed and generate a response email on their device. The response email may include the bulk token and be addressed to the email-based e-commerce system 220. As described above, the token is located in the body field, however, this is as an example only, and the token may be located in other fields of the email. The token may contain a vendor identifier.

The identifier may be the email address itself. To the customer, the target address of the response email may appear to be directed to the vendor server; however, it may be directed to the e-commerce system 220. The location of the e-commerce system 220 may be contained in a third party such as an email service provider, email client or hosting entity. The email-based e-commerce system 220 may receive the response email and perform a SPF/DKIM check to authenticate the sender of the email. Based on the result of the SPF/DKIM check, the e-commerce system 220 may continue processing the email. In a related embodiment, the QR code or barcode code may contain more than one set of offers and the customer's scanning application may generate a selection of mailto links or open a web page with a selection of offers. The customer may then select a mailto link and generate a response email with the required information.

Figure 11:
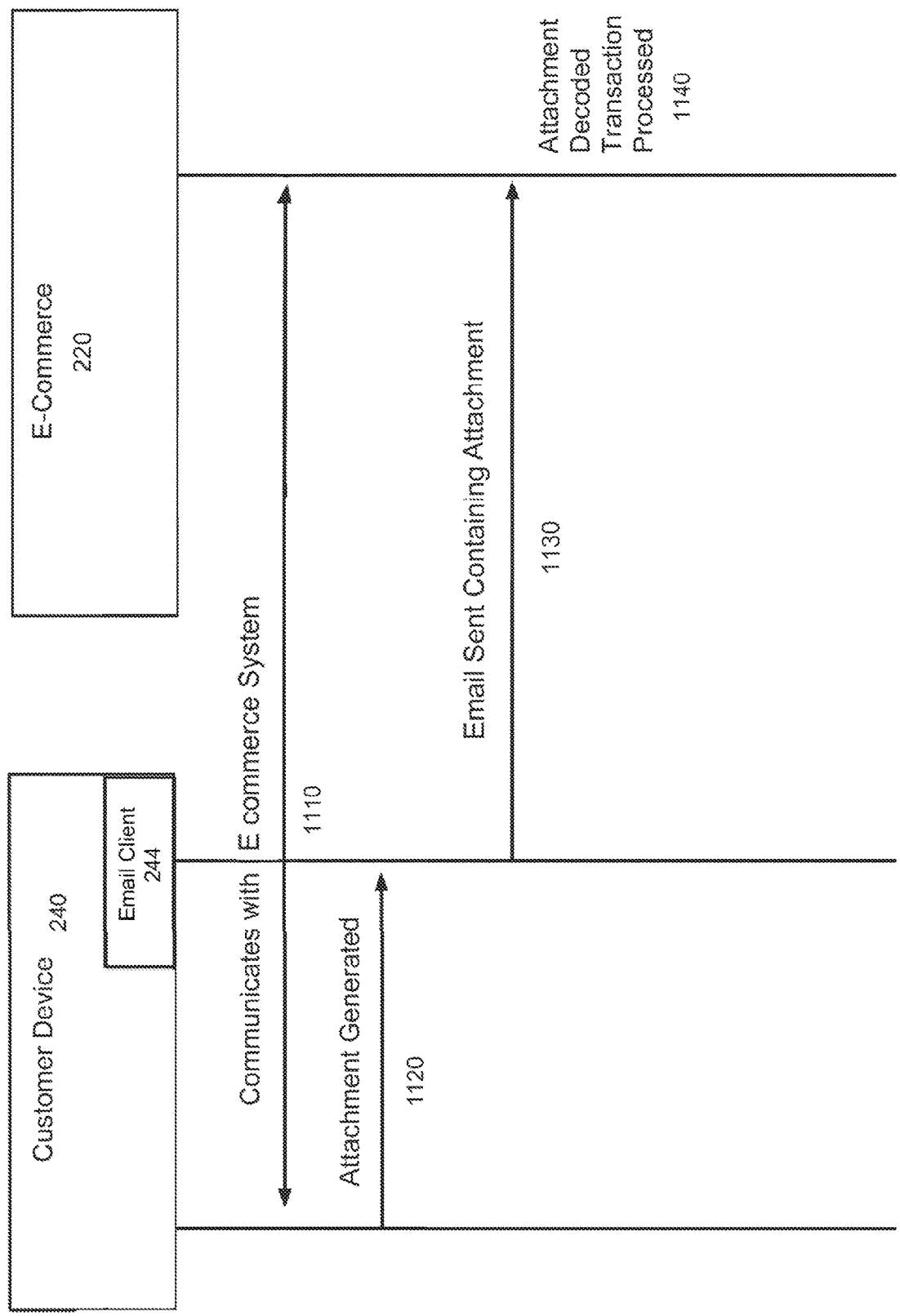
FIG. 11 illustrates a transaction flow diagram for image recognition that does not require an application on the customer's device.

FIG. 11 illustrates a transaction flow diagram for image recognition on the customer's device and may be filed as token as shown in method 1100. The image recognition may not require specific software be used on customer device 240. Customer device may utilize the camera found within customer device 240, for example. An image or another file format may be emailed to the e-commerce system 220. This email may contain all or some of the necessary information for the transaction. The image may be processed in the e-commerce system 220. In this embodiment, for example, the image of the QR, fingerprint or logo of the store may be emailed to the e-commerce system 220 to authenticate the email and then process the image or file. A variety of email authentication techniques including, but not limited to, SPF and DKIM may be used to authenticate the identity of the sender as discussed hereinabove. The image/attachment may also be used to authenticate the identity of the sender as discussed hereinabove.

In this embodiment, a customer device 240 may communicate with the e-commerce system 220 at step 1110. An attachment or image may be generated by an attachment application within customer device 240 at step 1120. The email client 244 of customer device 240 may send an email containing the attachment at step 1130 to the e-commerce system 220. Using an attachment decoder within the e-commerce system 220 the attachment may be decoded and the transaction processed at step 1140. The e-commerce system 220 may perform an SPF/DKIM check and the processing of the QR code may be performed by the e-commerce system 220 at step 1140. Although in this example, an attachment is used, this attachment may be a QR or any attachment or MIME Multipart or Mixed/Multipart message. These attachment(s) might appear in any field or in multiple fields. Different attachments may represent different parts of the order such as size, price destination and quantity and allow the system to parse the data based on that distinction. The attachment may serve as the form of authentication for example a voice recognition file or thumb print. The attachment may have the necessary information for the transaction or may represent a single category of information, or any portion of the information in between.

Figure 12:
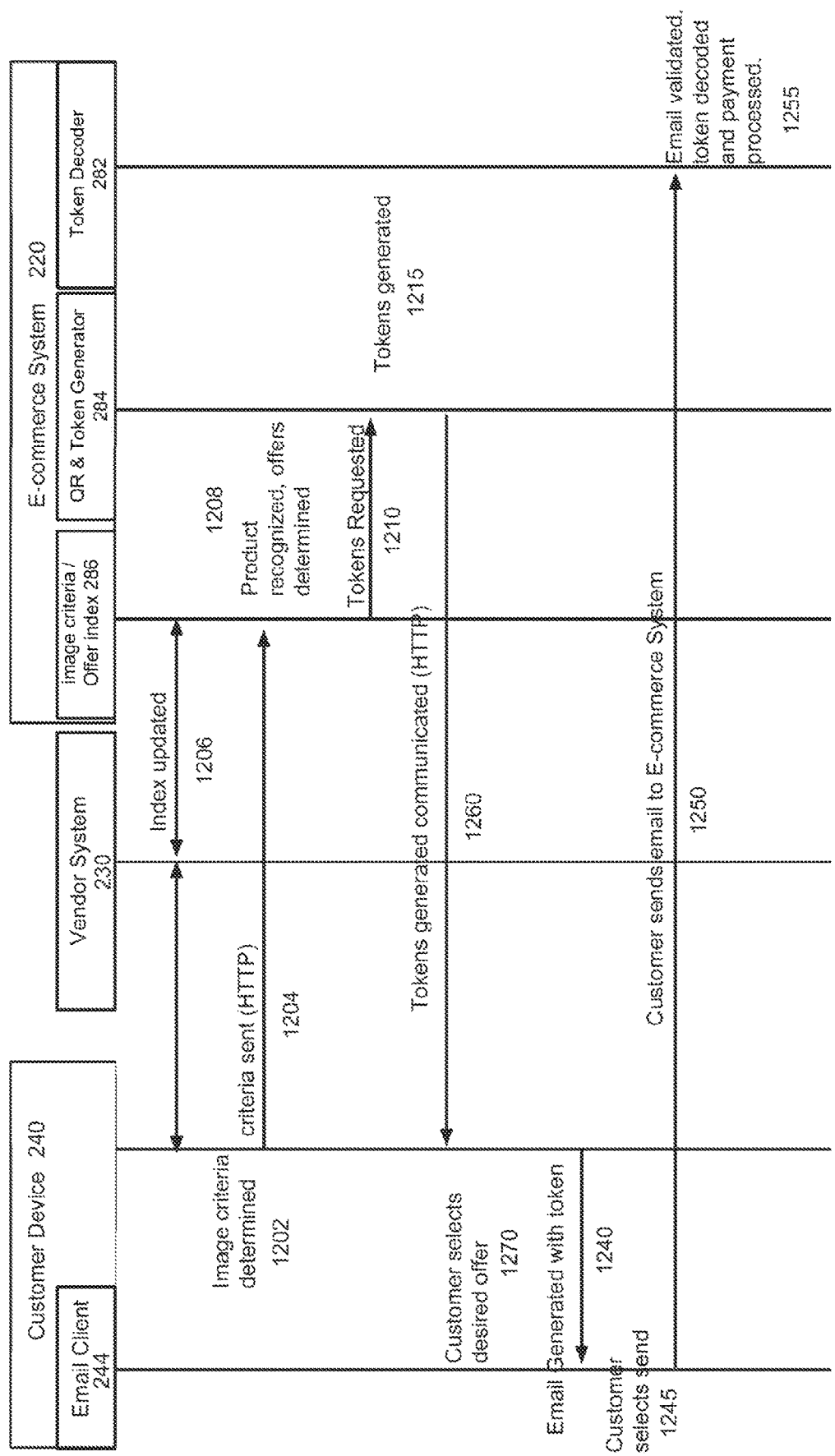
FIG. 12 illustrates a transactional flow diagram of email-based e-commerce with image recognition.

FIG. 12 illustrates a transactional flow diagram of email-based e-commerce with image recognition shown in method 1200. In the image recognition, the index may be updated at step 1206 by the e-commerce system 220. Once updated, an image criterion is determined by the customer device 240 at step 1202. The criteria may be sent to the e-commerce system 220 at step 1204. The product may be recognized and offers determined in the e-commerce system 220 at step 1208. The tokens may be requested at step 1210. The tokens may be generated at step 1215. The generated tokens may be communicated to the customer device 240 at step 1260. The customer may select the desired offer at step 1270. An email may be generated with the token at step 1240, the customer selects at step 1245 and an email is sent to the e-commerce system 220 at step 1250. The email is validated, token decoded and payment processed at step 1255.

An image recognition application may be used to recognize the product and present offers to a customer. Such an image recognition application may include an application that analyzes an image of a product to determine items within the image, and may then provide information about or associated with the product or related products. The customer selects an offer 1245 and generates an email 1250. The email is sent to the e-commerce system 220 and the payment processed 1255. In another embodiment the email-based e-commerce system 220 allows the vendor to modify a set of offers and associated offer details on the e-commerce system 220. This may be done on a web-based tool or via an API. The vendor may use this system to upload images or enter image properties and may associate these with a token. An index of offers may be accessed directly by customers and viewed in list form. A customer may be able to locate offers by viewing products on screen or by name or image. The application may also enable the customer to scan or photograph an image, and compare image properties with those properties and criteria stored in the server. Where criteria match, the application generates a series of offers stored on the server and displays them on the interface. Each offer may be associated with a mailto link in the display. The customer selects a mailto link and generates an email addressed to the e-commerce system 220 containing a token. Tokens may be encrypted or plain text strings which contain information to perform a transaction when sent to the e-commerce system(s) 220. A token may be one or multiple encrypted strings, files, passwords, cyphers, plain-text or other data which may contain information used to perform or authenticate a transaction.

To approve the purchase, the customer sends the email. When the e-commerce system 220 receives the email it validates the identity of the sender employing a variety of email authentication techniques including, but not limited to, SPF and DKIM. The e-commerce system 220 then decodes the token and processes the payment. The payment may also be processed by the vendor. Non-registered customers may be registered multiple ways, either at the moment of installation of the application or its first use via a URL or application interface. The customer may also be sent an email after the first email that has a URL link that when selected directs the customer to a signup page.

Figure 13:
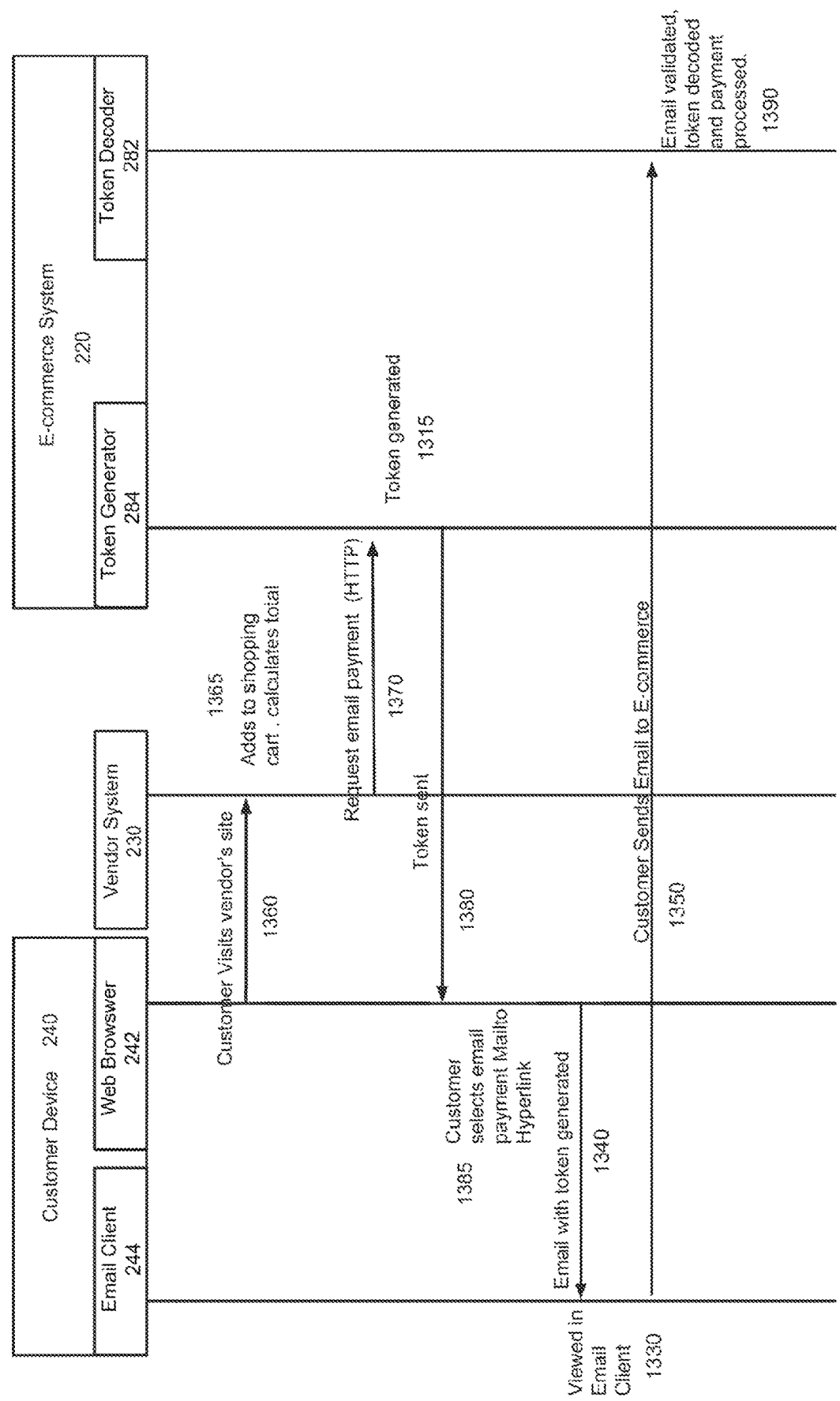
FIG. 13 illustrates a transactional flow diagram of mobile web checkout.

Referring now to FIG. 13, it illustrates a transactional flow diagram of a mobile web checkout operating when there is no request email shown in method 1300. This opens the response email directly. In this embodiment, a registered customer visits a registered vendor at step 1360 and places a series of items in their shopping cart using their customer device 240 interacting with vendor system 230. The vendor system 230 then calculates the total of the items in the cart at step 1365. Vendor system 230 then requests payment via email to e-commerce system 220 at step 1370. E-commerce system 220 generates a token at step 1315 using token generator 284, and sends the token to the customer device 240 at step 1380 using web browser. As has been discussed herein, while the description describes that the e-commerce system 220 generates the token, the token may be generated directly by the vendor system 230, for example. The user may select a payment option that may trigger the generation of an email addressed to the e-commerce system 220 and may include the token at step 1340. This email may be viewed in the email client 244 at step 1330. The customer device 240 may then send the email to the e-commerce system 220 at step 1350. This email may complete the purchase from the customer perspective. The email is validated and the token decoded using token decoder 282, and the payment is processed at step 1390.

Registered customers access a web browser within customer device 240 and may visit registered vendor system 230 websites and select products service or donations in a shopping cart in steps 1360 and 1365. The vendor's system is enabled to recognize the registered customer and when an update is made, the total charged is calculated and a new token is created by the e-commerce system 220 at step 1315. When the customer selects the option to pay by email mailto link the customer device initiates a view change, opening up the email client and generating the response email at step 1385 and 1340. The mailto link contains a command for the view shift, email generation as well as the token. The customer may be required to enter their email address. The response email is addressed to the e-commerce system 220 and has the token. The customer sends the email at step 1350. The e-commerce system 220 receives the email and authenticates the email address and decodes the token at step 1390. A variety of email authentication techniques including, but not limited to, SPF and DKIM might be used to authenticate the identity of the sender or the image/attachment may also serve that purpose. When the customer is authenticated, the payment is processed. In this example, the tokens are generated in the e-commerce system 220 but they may be generated in the vendor's system or in an application of the customer's device.

Figure 14:
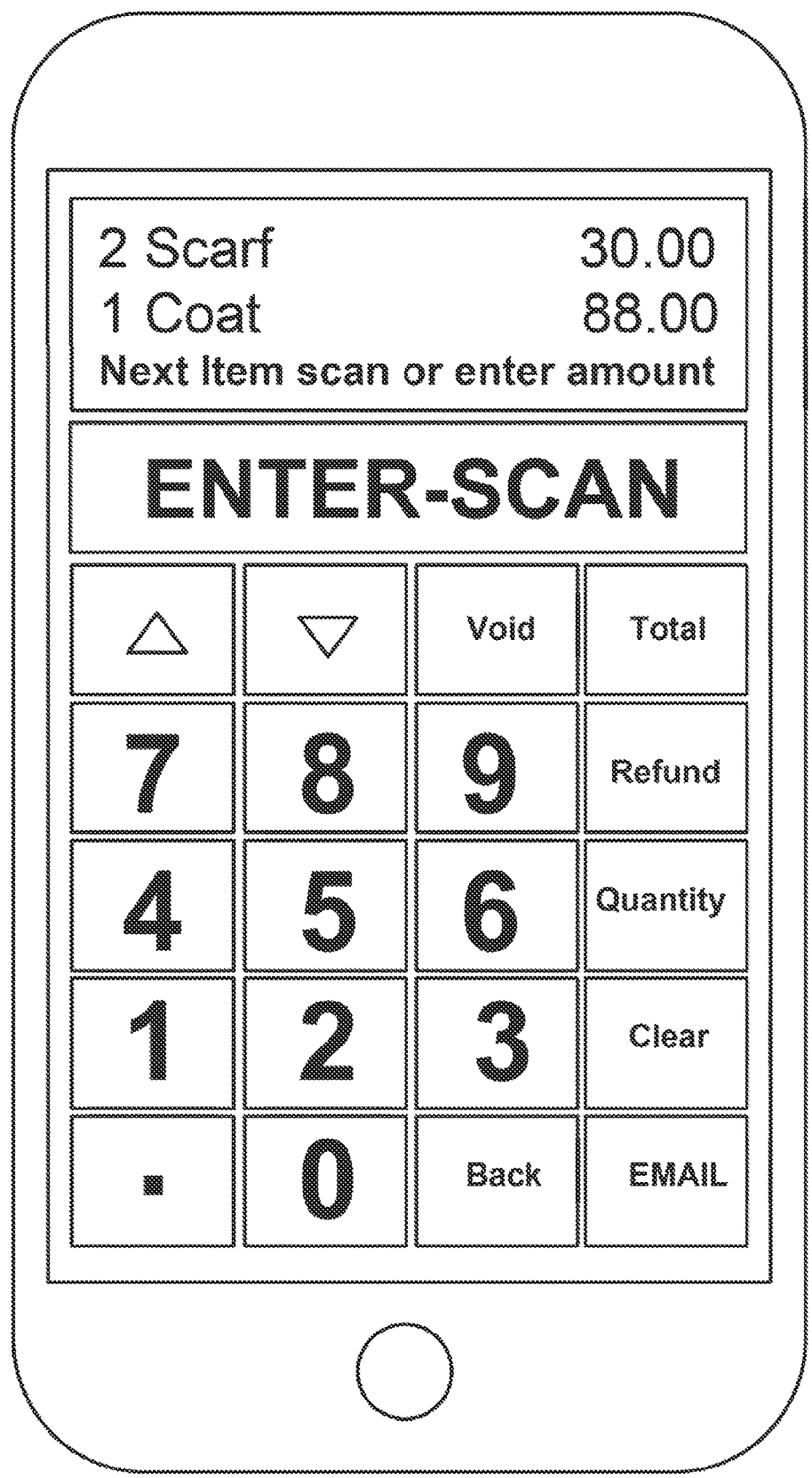
FIG. 14 illustrates an example of a smartphone application that is a cashier QR code/barcode reader with email client for email-based e-commerce transactions.

FIG. 14 illustrates an example of a smartphone application that is a cashier QR code/barcode reader with email client for email-based e-commerce transactions 1400. In this embodiment, a registered vendor generates QR codes in their brick and mortar store. Checkout personnel use the application either in their checkout counter or their smartphone tablet or computer. The application reads each item with the aid of the scanner and then produces a total amount due. This may also be manually typed in on the application. An example of one possible interface is shown in FIG. 14. This interface enables the checkout personnel to scan or manually type in the amounts and generate a total.

FIG. 15 illustrates a transactional flow diagram for application that includes a cashier QR code reader or other point of sale device with email client for email-based e-commerce transactions in method 1500. In method 1500, a registered vendor system 230 requests QR codes 1510 that are generated by the e-commerce system 220 via QR and token generator 284 at step 1515. The vendor system 230 receives the QR codes, such as in their brick and mortar store, at step 1520 and uses an application as a cashier. For example, the sales person may scan the offer at step 1560, and at the point of sale device 215 calculates a total for the transaction at step 1565. An email is generated at the point of sale device 215 requesting an invoice from the e-commerce system 220 and token generator 284 at step 1570. The e-commerce system 220 then sends an email request to the customer for confirmation at step 1575. This request may include a mailto link and a token. The customer may select the mailto link at step 1545 and may send an email to the e-commerce system 220 to process the payment 1550. The e-commerce system 220 may validate the email, decode the token and process the underlying payment at step 1555.

When the total cost is calculated, the vendors device requests that the e-commerce system 220 generate a token and sends an invoice to the customers email at step 1575. The customer receives the email that contains a mailto link associated with the total amount owed. This mailto link may be embedded behind an image, for example. The customer selects via customer device 240, the mailto link 1545, which generates a response email with at step 1550. The email is addressed to the e-commerce system 220. The e-commerce system 220 receives the email and authenticates the email address and decodes the token at step 1555 as described above. A variety of email authentication techniques including, but not limited to, SPF and DKIM might be used to authenticate the identity of the sender or the image/attachment may also serve that purpose. When the customer is authenticated, the payment is processed at step 1555. A notification, such as a summary of the transaction or receipt, for example, may be sent to the point of sale and to the customer. The point of sale cashier application may recognize the notification and file it. For example, the notification may be filed in preset categories determined by the checkout personnel or store management.

Figure 16A:
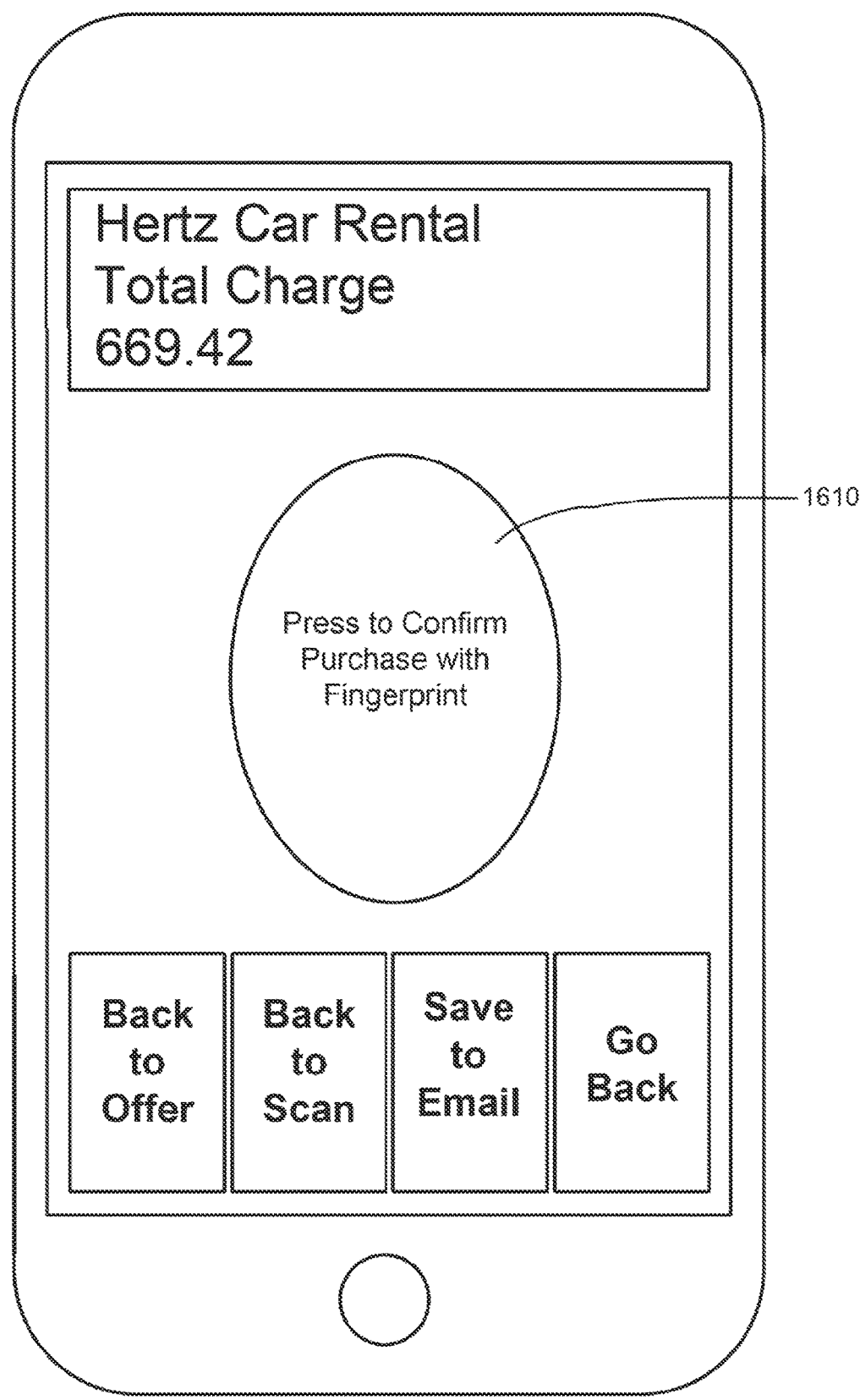
FIG. 16a illustrates an example of interface for biometric interface and email-based e-commerce.
Figure 16B:
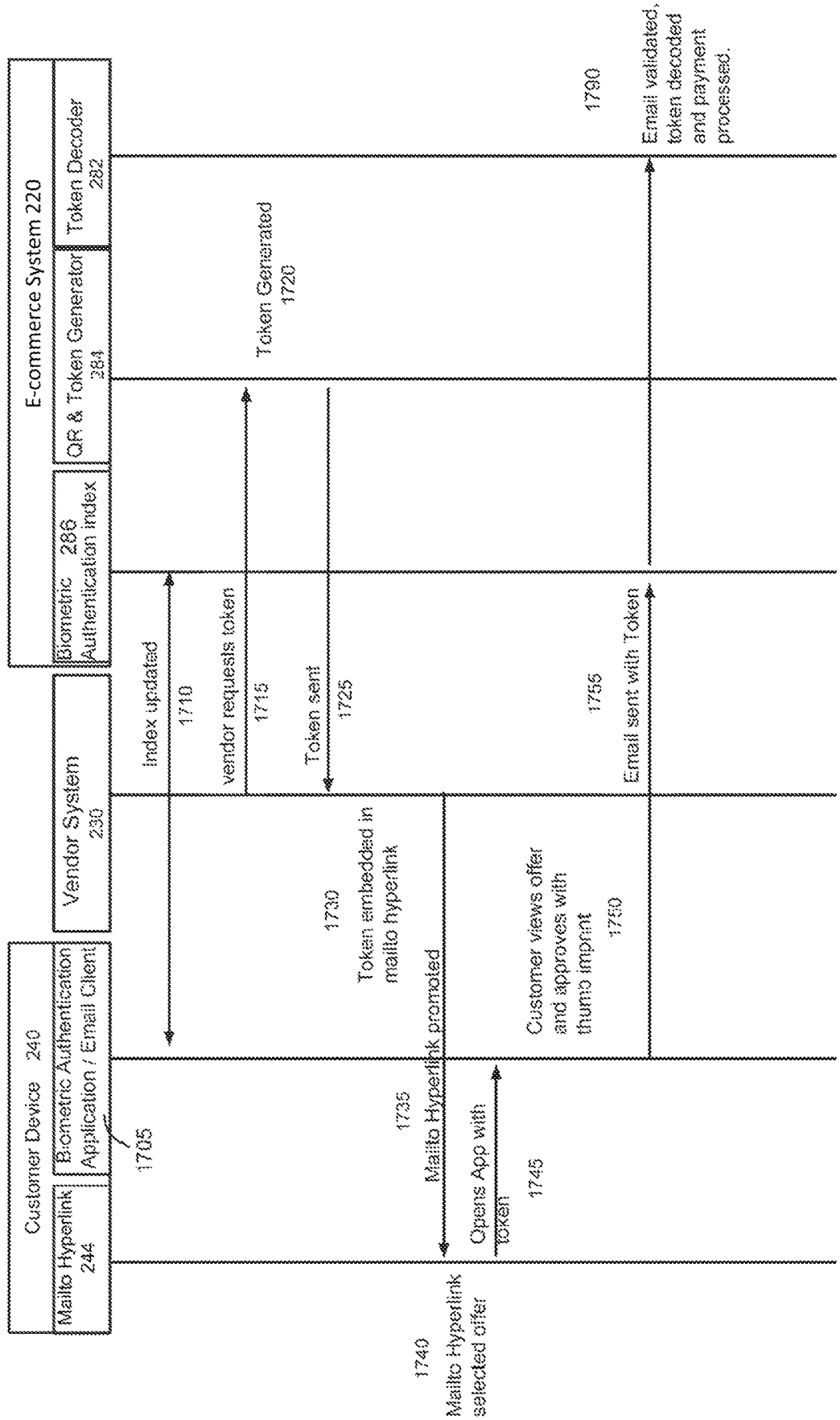
FIG. 16b illustrates a transactional flow diagram for biometric authentication and email-based e-commerce.

Referring now collectively to FIGS. 16*a-c*, there is shown a variation of the email-based e-commerce methods described herein. In this example, the mailto link is selected and opens an application that may offer the customer alternative options, such as a new payment method, and/or performs an authentication using biometric or password authentication. In this example, such a biometric authentication may take the form of a thumbprint. Once authenticated the email is sent and the payment processed. The authentication application may open the email client and generate the email confirmation or the authentication application may be embedded in the email client application itself. An authentication may also happen in the e-commerce system 220.

By way of specific example, FIG. 16*a* illustrates an example of interface for biometric interface and email-based e-commerce in method 1600 for use herein. An example of a thumbprint interface 1610 is shown operating on a customer device 240. In this example, the application requests authentication of a thumb print. Other types of authentication may also be used, including other criteria such as voice recognition, retinal scan, and movement of the phone or gesture on the screen, GPS or password, by way of non-limiting example only.

FIG. 16*b* illustrates a transactional flow diagram for biometric authentication and email-based e-commerce in method 1700. In method 1700, a customer registered with the e-commerce system 220 has installed an application 1705 that requires an additional confirmation by the customer. This confirmation may offer the customer alternatives to payment or provide enhanced security.

Method 1700 includes an index 286 being updated 1710 between the application 1705 and the biometric authentication of the e-commerce system 220. The vendor system 230 requests a token from the e-commerce system 220 at step 1715. The token is generated by the e-commerce system 220 at step 1720. The generated token is sent from the e-commerce system 220 to the vendor system 230 at step 1725. The token is embedded in a mailto link by the vendor system 230 at step 1730. The mailto link is promoted at step 1735. A customer selects an offer using customer device 240 in the mailto link at step 1740. The selection opens application on device 240 with token at step 1745. The customer views an offer on device 240 and approves with authentication, such as a thumbprint, at step 1750. An email including authentication information and the token is sent from the customer device 240 to the e-commerce system 220 at step 1755. The email is validated, the token decoded, and payment processed at step 1790. It should be noted that in an alternative embodiment, the biometric information (such as a fingerprint as or other identifiers as disclosed above) may comprise the token.

This application 1705 may be directly integrated into the email client and may require additional authentication such as a biometric sensor for example. In this example, the customer encounters a mailto link provided by a vendor who is also registered with the e-commerce system 220. The mailto links may be provided to the customer in various ways including but not limited to email, web URL, application, attachments, QR codes, barcodes, multipart or mix multipart messages. Embedded in the mailto link is a token that contains at least one identifier for biometric authentication which is recognized by the application. The mailto link may be embedded behind an image. The application 1705 parses the token and recognizes the command for additional confirmation and initiates the alternative payment method process. An application displays information about the purchase and a request for biometric authentication, for instance. The application 1705 may perform more than one function and may be part of other applications such as an email client. The application 1705 decodes the mailto link and the token and recognizes the command to engage the biometric authentication application before sending the email. The email client 244 and the biometric application 1705 are separate but for the customer they may appear as the same application. The token may also be generated by the application and not be present in the first mailto link. The application 1705 may be in communication with the vendor system 230, e-commerce system 220 or other third party. Since the email-based e-commerce system 220 is based in the security of the email client the same biometric authentication may be used to access the email client. In this example, the registered customer has securely stored a thumb or other finger imprint on the application. If confirmed, the application 1705 generates an email 180 that is addressed to the e-commerce system 220. This email 180 contains a token and is addressed to the e-commerce system 220. The token may include a derivative of the thumbprint or other biometrics. To confirm payment the customer sends the email to the e-commerce system 220. The gesture of pressing the thumb for imprint and the send function may be one gesture or separate. Or in another example of voice recognition the spoken word "send" or the phrase "I confirm this purchase" may be used as a form of authentication and the command to send the message or notification. When the e-commerce system 220 receives the email 180, it may validate the identity of the sender employing a variety of email authentication techniques including, but not limited to, SPF and DKIM. The e-commerce system 220 then decodes the token and processes the payment. This token has all the information required to process the transaction.

FIG. 16c illustrates a transactional flow diagram for alternative payment methods 210 as shown in method 1800. In method 1800, a customer registered with the e-commerce system 220 has installed an application on customer device 240 that requires an additional confirmation by the customer. This confirmation may offer the customer alternatives to payment for enhanced security at step 1850. One example of this method occurs when a customer chooses to direct the payment to a different payment wallet or credit card or debit banking or clearing house and this alternative payment method may be used at step 1855.

Specifically, method 1800 may include a vendor system 230 requesting a token from the e-commerce system's 220 QR and token generator 284 at step 1815. The token may be generated by the QR and token generator 284 at step 1820. The e-commerce system 220 may send the token to the vendor system 230 at step 1825. The vendor system 230 may then embed the token in a mailto link at step 1830. This mailto link may then be delivered or promoted by the vendor system 230 to the customer device 240 at step 1835. The customer device 240 using the mailto link of email client 244 may select an offer at step 1840 and then the customer device 240 may open an application with the token at step 1845. This application may be similar to the application 1705 of FIG. 16b, for example. The customer through customer device 240 may view the offer and approve alternative payment methods at step 1850. The application via customer device 240 may alert the alternate payment method at step 1855.

Figure 18:
FIG. 18 illustrates an example of a shortened QR code.

QR codes vary graphically in complexity and number of patterns utilized in their composition. One limitation often encountered is the necessity for large complex QR codes to be used in order to contain all of the necessary token data required for an email based transaction. A method 1900 illustrated in FIG. 17 may be utilized. In method 1900, a graphically less complex QR code 2000, such as the code illustrated in FIG. 18, may be used. QR code 2000 may include less information encoded. A larger customer base may be accessed with the use of graphically simpler QR codes because a greater variety of reader applications may be utilized. The vendor system 230 using a web-based application or a direct integration with the e-commerce system 220 requests a QR code at step 1910 and token from the e-commerce system's 220 QR code and token generator 284 is generated at step 1915. The code is processed through a URL shortener, which generates code that requires less graphically complex QR code. The URL shortener is located in the ecommerce system 220 in this example, however this shortener may also be a separate system or located elsewhere within the present system. The QR code is shared with the vendor system 230 at step 1920 and stored in a database accessible to the application server. The vendor system 230 publishes the QR code at step 1925. The reader is an application on a smartphone, for example. Using a QR reader 246 on customer device 240, the customer scans the QR code at step 1930 and the application opens the default web browser 242 at step 1935 directed to the shortened URL on the application server using a mailto link request at step 1940. This request is translated by the URL shortening service on the e-commerce system 220 to the original mailto link at step 1950 and the token from the e-commerce system 220 is returned to the customer's device 240 at step 1955. The email client 244 on the customer device 240 is opened and the response email is generated at step 1960. This response is addressed to the e-commerce system 220 with the token required and the email is sent at step 1965. On some devices, the QR reader may not display the browser to the customer. Visually the customer may experience the scanning of the code and the generating of a response email. The customer approves the transaction by sending the email addressed to the ecommerce system 220 at step 1965. When the e-commerce system 220 receives the email it validates the identity of the sender employing a variety of email authentication techniques including, but not limited to, SPF and DKIM. The e-commerce system 220 then decodes the token and processes the payment at step 1970.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for improving security of an e-commerce transaction using Simple Mail Transfer Protocol (SMTP), the method comprising:
   providing a QR code to a particular user, wherein the QR code includes a token that is associated with the particular user for the e-commerce transaction;
   receiving, via SMTP, a response email that includes the token from an email address of a sender, wherein the response email is generated in response to activation of the QR code provided to the particular user;
   performing a validation of the email address of the sender using at least one of Sender Policy Framework (SPF) or DomainKeys Identified Mail (DKIM) validation; and
   on a condition that the validation of the email address of the sender is successful:

decoding the token received in the response email to generate a decoded token, identifying an email address of the particular user based on the decoded token, and processing the e-commerce transaction when the email address of the sender matches the email address of the particular user identified.

2. The method of claim 1 wherein the QR code includes an embedded mail-to link that generates the SMTP response email.

3. The method of claim 1, wherein the QR code is provided via a Point of Sale (POS) system.

4. An system that improves security of an e-commerce transaction, the system comprising:

a memory;

a communication interface; and one or more processors that are communicatively coupled to the memory and the communication interface, wherein the one or more processors are collectively configured to:

provide a QR code to a particular user, wherein the QR code includes a token that is associated with the particular user for the e-commerce transaction;

receive, via SMTP, a response email that includes the token from an email address of a sender, wherein the response email is generated in response to activation of the QR code provided to the particular user;

performing a validation of the email address of the sender using at least one of Sender Policy Framework (SPF) or DomainKeys Identified Mail (DKIM) validation; and on a condition that the validation of the email address of the sender is successful:

decode the token received in the response email to generate a decoded token, identify an email address of the particular user based on the decoded token, and process the e-commerce transaction when the email address of the sender matches the email address of the particular user identified.

5. The system of claim 4 wherein the QR code includes an embedded mail-to link that generates the SMTP response email.

6. The system of claim 4 wherein the QR code is provided via a Point of Sale (POS) system.

7. A non-transitory computer readable storage medium storing instruction for utilizing Simple Mail Transfer Protocol (SMTP) to improve security of an e-commerce transaction, the instructions, when executed by one or more processors, cause the one or more processors to collectively execute a method comprising:

providing a QR code to a particular user, wherein the QR code includes a token that is associated with the particular user for the e-commerce transaction;

receiving, via SMTP, a response email that includes the token from an email address of a sender, wherein the response email is generated in response to activation of the QR code provided to the particular user;

performing a validation of the email address of the sender using at least one of Sender Policy Framework (SPF) or DomainKeys Identified Mail (DKIM) validation; and on a condition that the validation of the email address of the sender is successful:

decoding the token received in the response email to generate a decoded token, identifying an email address of the particular user based on the decoded token, and processing the e-commerce transaction when the email address of the sender matches the email address of the particular user identified.

8. The non-transitory computer readable storage medium of claim 7 wherein the QR code includes an embedded mail-to link that generates the SMTP response email.

9. The non-transitory computer readable storage medium of claim 7 wherein the QR code is provided via a Point of Sale (POS) system.

* * * * *